United States Patent [19]

Sindhu et al.

[11] Patent Number: 5,265,235
[45] Date of Patent: Nov. 23, 1993

[54] CONSISTENCY PROTOCOLS FOR SHARED MEMORY MULTIPROCESSORS

[75] Inventors: Pradeep S. Sindhu, Mountain View, Calif.; Cesar B. Douady, Paris, France

[73] Assignee: Xerox Corporation, Stamford, Conn.

[21] Appl. No.: 23,854

[22] Filed: Feb. 26, 1993

Related U.S. Application Data

[63] Continuation of Ser. No. 951,926, Sep. 25, 1992, which is a continuation of Ser. No. 620,496, Nov. 30, 1990, abandoned.

[51] Int. Cl.$^5$ .................. G06F 12/00; G06F 12/08; G06F 13/14; G06F 15/16
[52] U.S. Cl. .................. 395/425; 395/725; 364/DIG. 1; 364/243.41; 364/243.45; 364/243.44; 364/240.8
[58] Field of Search .............. 395/425, 725; 364/DIG. 1

[56] References Cited

U.S. PATENT DOCUMENTS 4,843,542  6/1989  Dashiell et al. ............ 364/200
5,025,365  6/1991  Mathur et al. ............ 364/200

OTHER PUBLICATIONS

David V. James edited by Dubois et al., "Cache and Interconnect Architectures in Multiprocessors, SCI (Scalable Coherent Interface) Cache Coherence," Kluwer Academic Publishers, 1990, pp. 189–208.

Andrew W. Wilson, Jr., "Hierarchical Cache/Bus Architecture for Shared Memory Multiprocessors," Computer Architecture Conference (IEEE/ACM), 1987, pp. 244–252.

Primary Examiner—Alyssa H. Bowler

[57] ABSTRACT

A shared memory multiprocessor having a packet switched bus, together with write back caches for connecting individual processor to that bus, employs a consistency protocol that permits the caches to store multiple copies of read/write data at identical physical addresses for use as needed by the respective processors. The protocol causes the hardware to automatically and transparently maintain the consistency of this data. To that end, the caches detect when a datum becomes shared by monitoring the traffic on the bus, thereby enabling them to broadcast an updating write on the bus whenever their respective processors issue a write to a shared address. If desired, this protocol may be extended to include an advisory invalidate for reducing the amount of address sharing that occurs, thereby enhancing the efficiency of the protocol. The protocol maintains a consistent view of memory for the processors, while permitting I/O devices to have direct access to the memory system.

3 Claims, 10 Drawing Sheets

CONSISTENCY PROTOCOLS FOR SHARED MEMORY MULTIPROCESSORS

This is a continuation of application Ser. No. 07/951,926, filed Sep. 25, 1992 which was a continuation of Ser. No. 07/620,496 filed Nov. 30, 1990 now abandoned.

FIELD OF THE INVENTION

This invention relates to consistency protocols for shared memory multiprocessors that have packet switched memory busses and, more particularly, to update protocol, which may be used alone or in combination with an advisory invalidation protocol, for maintaining cache coherency in such a multiprocessor environment.

BACKGROUND OF THE INVENTION

A key goal in designing computer memory busses is to maximize their usable bandwidth. A short bus cycle time is required to achieve this, but that alone does not ensure that the usable bandwidth of the bus will be comparable to its electrical bandwidth because the bus must also have a high efficiency (conventionally defined as the ratio of the usable bus bandwidth to its electrical bandwidth) to achieve that goal.

Indeed, a short bus cycle time is of relatively little value for increasing the usable bandwidth of a conventional circuit switched bus because the circuit switching of the bus serializes the request/reply pairs for successive transactions on a transaction-by-transaction basis. As is known, a cache memory system can be employed for reducing the number and frequency of the main memory transactions a computer system is required to perform, but in high performance systems the traffic on the memory bus usually still is a dominant performance limiting factor.

Unfortunately, the access time of economically practical main memory typically is several times longer than the minimum realizable bus cycle time, so the usable bandwidth of a circuit switched bus tends to be limited by the main memory access time. In systems having cache memory, the wasted "wait" cycles of a circuit switched bus (i.e., its wasted bandwidth) may be reduced by increasing the size of the main memory/cache memory data transport unit, thereby amortizing the bus wait cycles over larger blocks of data. However, this approach tends to increase the bandwidth load that is placed on the bus by the processor or processors, which at least partially negates the benefit of the larger data transfer unit.

Others have recognized that the bandwidth penalty caused by idle bus cycles can be avoided by employing a "packet switched" bus (sometimes also referred to as a "split cycle" bus, or a "pending" bus). Packet switching of the bus dissociates the requests and the replies of bus transactions from each other, thereby permitting requests and replies for multiple transactions to be interleaved on the bus. As a general rule, idle bus cycles can be avoided simply by dissociating the requests and replies of the transactions in which main memory participates (i.e., the "main memory transactions"). However, it has been found that it is advantageous to dissociate the requests and replies of all bus transactions, so that a variable number of bus cycles (in excess of the implementionally dependent minimum number of cycles) may intervene between any request and its corresponding reply, subject only to the possible expiration or abortion of a request to which no reply is received within a predetermined timeout period. This essentially complete dissociation of all requests and replies helps eliminate bus deadlocks, while making it easier to interface the bus with non-synchronized devices, such as with the memory busses of dissimilar or "foreign" computer systems, including industrial standard systems. Furthermore, it facilitates the use of interleaved main memory modules, and simplifies the solution to the cache consistency problem for multiprocessors having multilevel, hierarchical cache memory systems.

Usable bus bandwidth and cache consistency are related but separable issues. As will be appreciated, cache consistency is a more detailed consideration because it is a specific requirement for busses which provide access to multiple cached copies of shared data while permitting different ones of the cached data copies to be updated under the control of different processors, such as in multiprocessors.

There are several known solutions to the cache consistency problem for circuit switched busses. See, for example, a copending and commonly assigned United States patent application of Pradeep S. Sindhu et al, which was filed Nov. 12, 1986 under Ser. No. 929,544 on "Multi-Level Cache Memory Trees for Multiprocessors". However, the known techniques for maintaining cache consistency are not directly applicable to packet switched busses. See, Andrew W. Wilson, Jr., "Hierarchical Cache/Bus Architecture for Shared Memory Multiprocessors," Computer Architecture Conference (IEEE/ACM), 1987, pp 244–252.

SUMMARY OF THE INVENTION

In accordance with the present invention, a shared memory multiprocessor having a packet switched bus, together with write back caches for connecting individual processors to that bus, employs a consistency protocol that permits the caches to store multiple copies of read/write data at identical physical addresses for use as needed by the respective processors. The protocol causes the hardware to automatically and transparently maintain the consistency of this data. To that end, the caches detect when a datum becomes shared by monitoring the traffic on the bus, thereby enabling them to broadcast an updating write on the bus whenever their respective processors issue a write to a shared address. If desired, this protocol may be extended to include an advisory invalidate for reducing the amount of address sharing that occurs, thereby enhancing the efficiency of the protocol. The protocol maintains a consistent view of memory for the processors, while permitting I/O devices to have direct access to the memory system.

BRIEF DESCRIPTION OF THE DRAWINGS

Still other advantages and features of this invention will become apparent when the following detailed description is read in conjunction with the attached drawings, in which.

DETAILED DESCRIPTION OF THE ILLUSTRATED EMBODIMENTS

Figure 1:
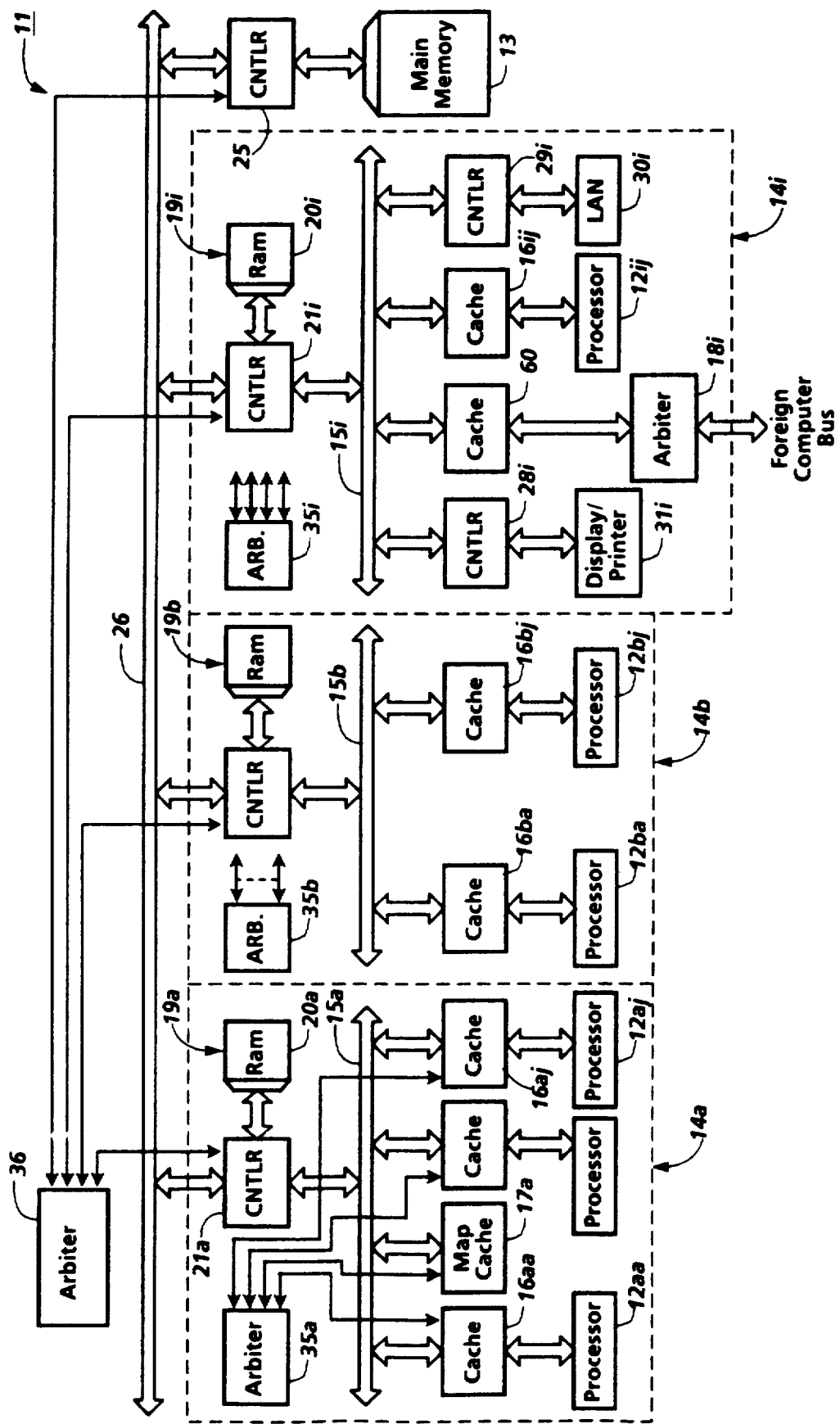
FIG. 1 is a simplified block diagram of a shared memory multiprocessor having a hierarchical cache memory system with which the present invention may be utilized to advantage.

While the invention is described in some detail hereinbelow with reference to certain illustrated embodiments, it is to be understood that there is no intent to limit it to those embodiments. On the contrary, the aim is to cover all modifications, alternatives and equivalents of the invention as defined by the appended claims.

There are several important features of the memory systems that are disclosed herein, so the disclosure is organized as follows to assist in locating material relating to the different features:

I. An Initial Embodiment
  A. System Architecture
    1. Bus and Memory Hierarchy
      a. Multilevel Bus System
  B. Bus Logical Terminology
  C. Bus Physical Terminology
  D. Device-Bus Interface
    1. Signals
    2. Arbitration Interface
    3. Data/Control Interface
    4. Consistency Port
  E. Transactions
    1. Memory Related Transactions
    2. I/O Transactions
    3. Miscellaneous Transactions
  F. Data Consistency
    1. Data Consistency in Single Level Systems
    2. Data Consistency in Multilevel Systems
II. An Enhanced Embodiment
  A. System Architecture
  B. Device-Bus Interface
    1. Signals
    2. Arbitration Interface
    3. Data/Control Interface
    4. Consistency Port
  C. Transactions
    1. Memory Related Transactions
    2. I/O Transactions
    3. Miscellaneous Transactions
  D. Data Consistency I. An Initial Embodiment Turning now to the drawings, and at this point especially to FIG. 1, there is a multiprocessor 11 having a plurality of processors 12aa-12ij and a shared main memory 13. Although the main memory 13 is depicted as being centralized, it will be understood that it may be distributed to provide a disjoint (i.e., mutually exclusive and exhaustive) cover of the used subset of the physical address space.

A. System Architecture

1. Bus and Memory Hierarchy

The processors 12aa-12ij are organized in one or more clusters 14a-14i, each of which has an arbitrated, packet switched, local bus 15a-15i, respectively. In the illustrated embodiment each of the clusters 14a-14i includes one or more of the processors 12aa-12ij, although that is not mandatory. For instance, if desired, one of the clusters could be dedicated to performing I/O for the multiprocessor 11. It is, however, important that each of the processors 12aa-12ij is coupled to its cluster or "local host" bus 15a..., or 15i by a first level cache memory 16aa-16ij, respectively (it being understood that the processors themselves may be include one or more even lower levels of cache memory, not shown) because the processors 12aa-12ij communicate with their host busses via their cache memories 16a-1-6ij. The local busses 15a-15i, in turn, link the caches 16aa-16ij to the shared resources within the clusters 14a-14i, respectively. For example, the local bus 15a of the cluster 14a interconnects the first level caches 16aa-16aj for the processors 12aa-12aj, respectively, with an optional map cache 17a, and with an intermediate level or second level cache memory 19a. As shown, the second level cache 19a is composed of a random access memory (RAM) module 20a and a controller 21a.

a. Multilevel Bus Architecture

The illustrated multiprocessor 11 has a hierarchical architecture, so like reference numerals are employed to identify like components at the different levels of the hierarchy. Moreover, alphabetic suffixes have been appended to the reference numerals to aid in identifying the hierarchical dependency of the components (see the first character of the dual character suffixes) and to distinguish between like components having a common dependency (see the second character of the dual character suffixes).

If desired, any one of the clusters 14a–14i could be configured to operate as a fully functional, monoprocessor or multiprocessor computer system. The bus protocol of the present invention provides sufficient usable bus bandwidth to support several processors on a single bus, which is a system configuration that would provide ample computing power for most existing desktop workstation applications and for many existing print server and file server applications. However, the tree-like, hierarchical architecture of the multiprocessor 11 effectively isolates the local cluster bus transactions from most transactions on the global bus 26, such as the global main memory transactions. Consequently, the bus traffic and the electrical loading of the busses are distributed, thereby permitting the construction of even larger and more powerful multiprocessors.

Indeed, while only two levels of hierarchy are illustrated, it will be understood that the tree-like architecture of the multiprocessor 11 is extensible through the use of additional layers of cache memory (not shown) for interconnecting two or more busses at any given level of the hierarchy with a bus at the next higher level. As will be seen, the cache memory 16aa–16ij and 19a–19i is organized as a cache memory tree, with the storage capacities of the caches typically decreasing with increasing depth in the tree. The same bus protocol is employed at all levels of the hierarchy, so the system designer has substantial freedom to reconfigure the multiprocessor 11 to better tailor it to the specific requirements of a particular application.

Main memory 13 is connected to the top level, "global" bus 26 via a suitable controller 25, but processors and I/O devices may be connected to busses at any level of the hierarchy. The bus hierarchy is completely transparent to all bus clients (i.e., the caches 16aa–16ij for the processors 12aa–12ij, respectively; the cache 60 through which an I/O bridge 18i communicates with its host bus 15i; the controllers 28i and 29i through which a local area network (LAN) 30i and a display or printer device 31i, respectively communicate with their host bus 15i; the second level caches 19a–19i through which the clusters 14a–14i, respectively, communicate with the global bus 26, and the controller 25 through which main memory 13 communicates with the global bus 26), so the clients do not need to be customized for any of the possible system configurations. As described more fully hereinbelow in Section I.D., the bus-client interface is independent of the system configuration.

B. Bus Logical Terminology

The bus protocol of the present invention involves bus operation at three distinct levels—viz., the electrical level of the bus cycles, the logical level of the packets, and the functional level of the transactions. As a matter of definition, a "bus cycle" is one complete period of the clock on any given bus, so it is the unit of time for electrical information transfer via a single bus. A "packet," in turn, is a contiguous sequence of successive bus cycles for logical information transfer. And, a "transaction" is composed of a "request" packet and a corresponding "reply" packet for performing a logical function, such as a data fetch operation (i.e., a data read from a specified memory address location) or a data store operation (i.e., a data write to a specified memory address location). As previously pointed out, all request/reply pairs are dissociated, so the request and reply for any transaction may be separated by an arbitrary number of bus cycles, up to a limit determined by a preselected timeout period for a "pending request" (i.e., a request that is awaiting a reply). Characteristically, the first cycle or so-called "header" of each packet carries address and control information, while subsequent cycles carry data if they are required to do so by the definition of the transaction.

Each of the busses 15a–15i and 26 is synchronous, but they are not necessarily synchronized with each other because all bus-to-bus information transfer is fully buffered by caches, such as the second level caches 19a–19i. Furthermore, as more fully described hereinbelow, each of the busses 15a–15i and 26 is independently arbitrated by arbiters 35a, 35b, 35i and 36.

Every client device on a packet switched bus (as a matter of definition, a "client device"-sometimes also referred to as a "bus client"-is a device that transmits and/or receives packets via a host bus 14a–14i or 26) must be able to function both as a bus "master" and as a bus "slave." However, the transaction level interaction of the client devices is somewhat easier to understand if the client that issues a request packet for initiating a given transaction is defined as being a "requestor" and if any device that issues a reply packet in response to such a request is defined as being a "responder." As will be seen, there is no more than one responder to any given request.

In operation, an arbiter grants the bus to a requestor in response to an arbitration request that is made by the requestor. The requestor becomes the bus "master" when it is granted the bus, so that it then issues its request packet. All of the other bus clients examine the address and the command that are carried by this packet to determine whether they are required to take any action or not. The client or clients that are required to take action function as "slaves" to perform the required action, but the bus is released by the requestor as soon as it is finished issuing its request packet. Thus, the responder must make its own independent arbitration request to acquire bus mastership from the arbiter before it can return its reply packet to the requestor. This reply packet is addressed to the requestor, so the requestor operates in a slave mode to receive it.

C. Bus Physical Terminology

Any given bus (e.g., any of the local busses 15a–15i or the global bus 26) may be composed of multiple segments, but there preferably is no more than one bidirectional bus segment within any single bus to avoid degrading the bus performance. Thus, referring to FIGS. 3A–3C, it will be seen that the segments of each bus are connected via synchronously clocked pipeline registers 37, regardless of whether the computer system is configured as a monoboard computer as in FIG. 3A, a multiboard computer as in FIG. 3B, or a multiboard-/multimodule computer as in FIG. 3C. Pipelining is not essential to the bus protocol of this invention or for maintaining the cache consistency which the protocol assures, but it facilitates the optimization of the electrical characteristics of the bus or busses. It should be understood, however, that pipelining is a feasible option because each of the busses is packet switched.

Figure 3A:
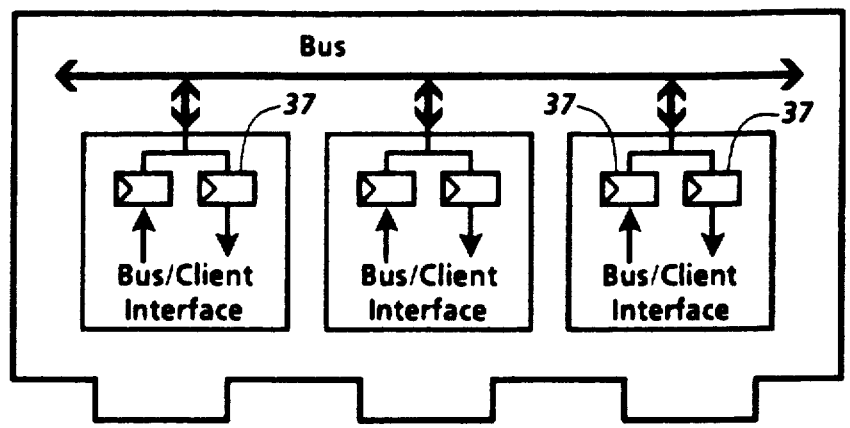
FIG. 3A is a schematic diagram of a pipelined memory bus for a monoboard computer embodying the present invention.
Figure 3B:
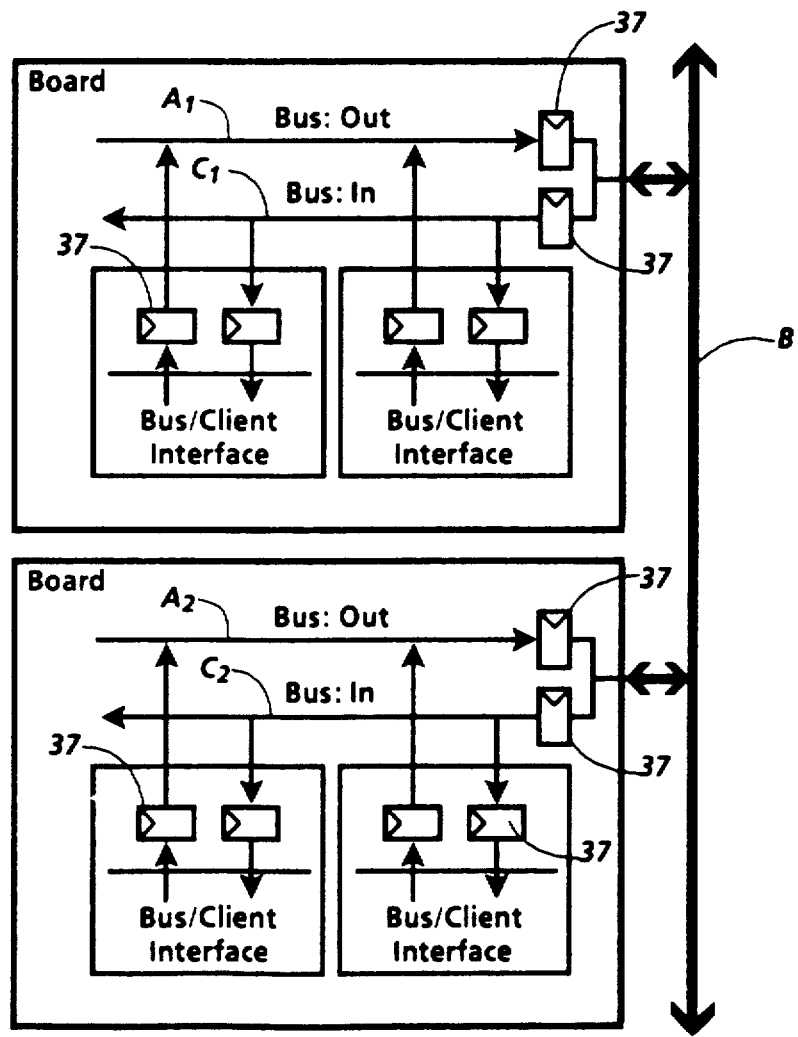
FIG. 3B is a schematic diagram of a pipelined memory bus for a multiboard embodiment of the invention.
Figure 3C:
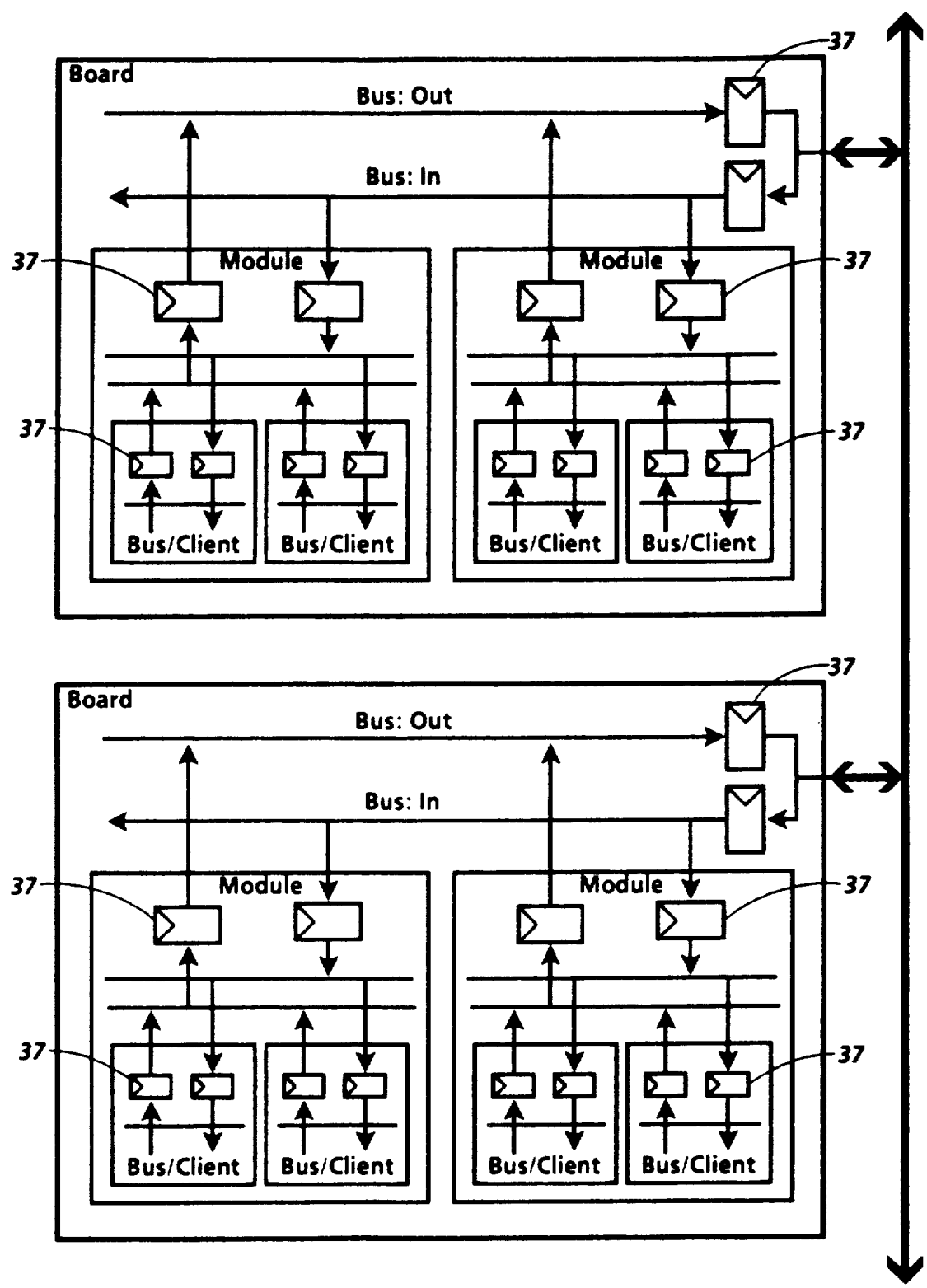
FIG. 3C is a schematic diagram of a pipelined memory bus for a multiboard, multimodule embodiment of the invention.

More particularly, the systems depicted in FIGS. 3A–3C have two, three and four levels of pipelining, respectively. Preferably, the pipelined bus segments are short and are of generally equal length to minimize and more or less equalize electrical signal propagation delay times. Moreover, in practice some or all of the bus segments may be terminated by balanced resistive terminations or the like (not shown) to suppress unwanted signal reflections. It is to be noted, however, that the electrical characteristics of the bus and the bus protocol are essentially independent of each other.

D. Device-Bus Interface

Figure 2:
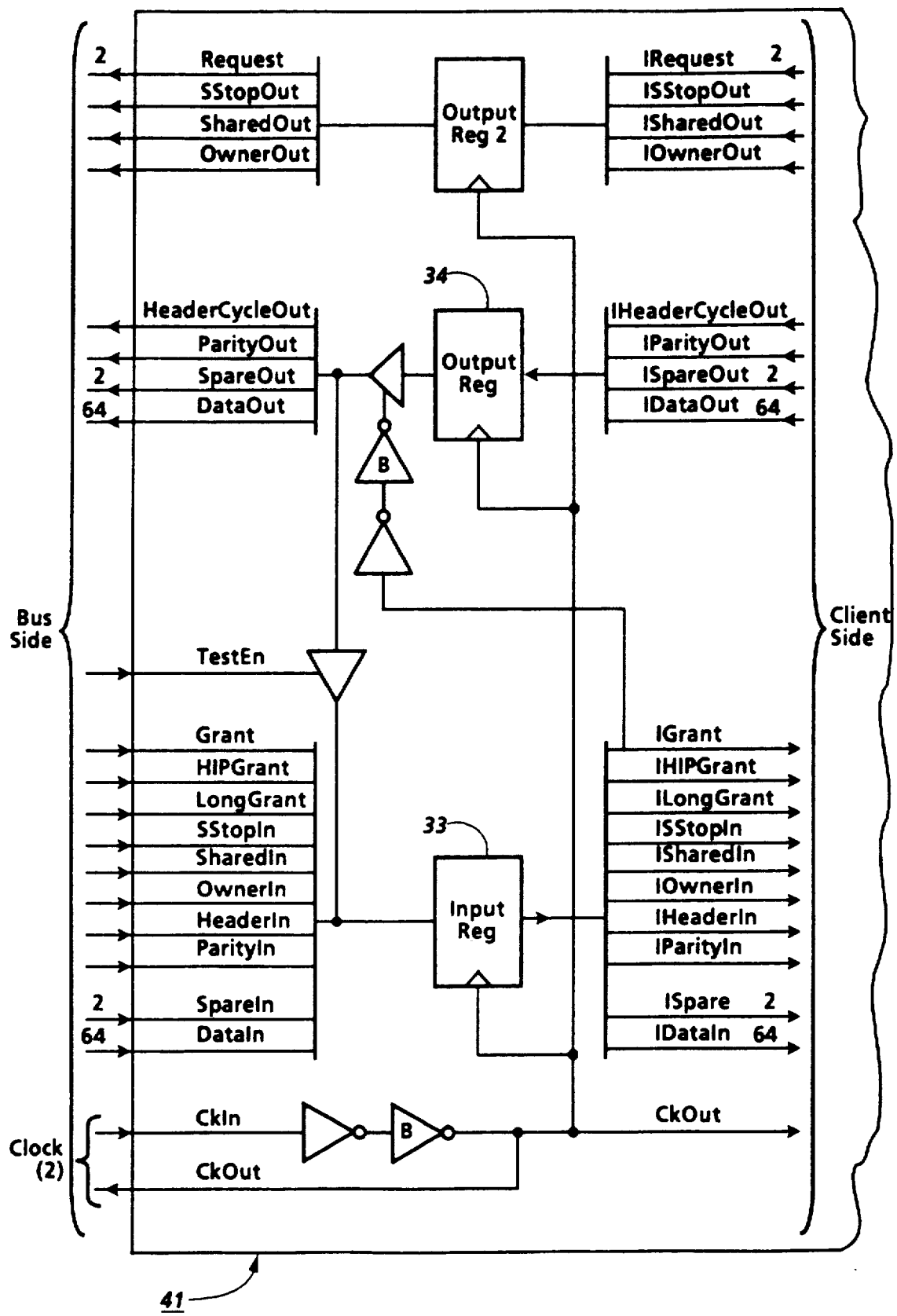
FIG. 2 is a simplified schematic diagram of the internal logic of a standard bus/client interface for the multiprocessor shown in FIG. 1.

As will be recalled, standardized bus interfaces, such as shown in FIG. 2 at 41, are provided for electrically interconnecting the busses 14a-14i and 26 with their respective "client devices." Preferably, these bus clients have open drain CMOS drivers and receivers (see a copending and commonly assigned United States patent application of William F. Gunning, which was filed Mar. 30, 1990 under Ser. No. 07/502,372 on "Drivers and Receivers for Interfacing VLSI CMOS Circuits to Transmission Lines,") for applying output signals to the bus and for receiving input signals from the bus, respectively. The advantage of using such drivers and receivers on the client side of the interface 41 is that their power consumption is sufficiently low to permit this invention to be implemented using currently available VLSI technology.

1. Signals

Figure 4:
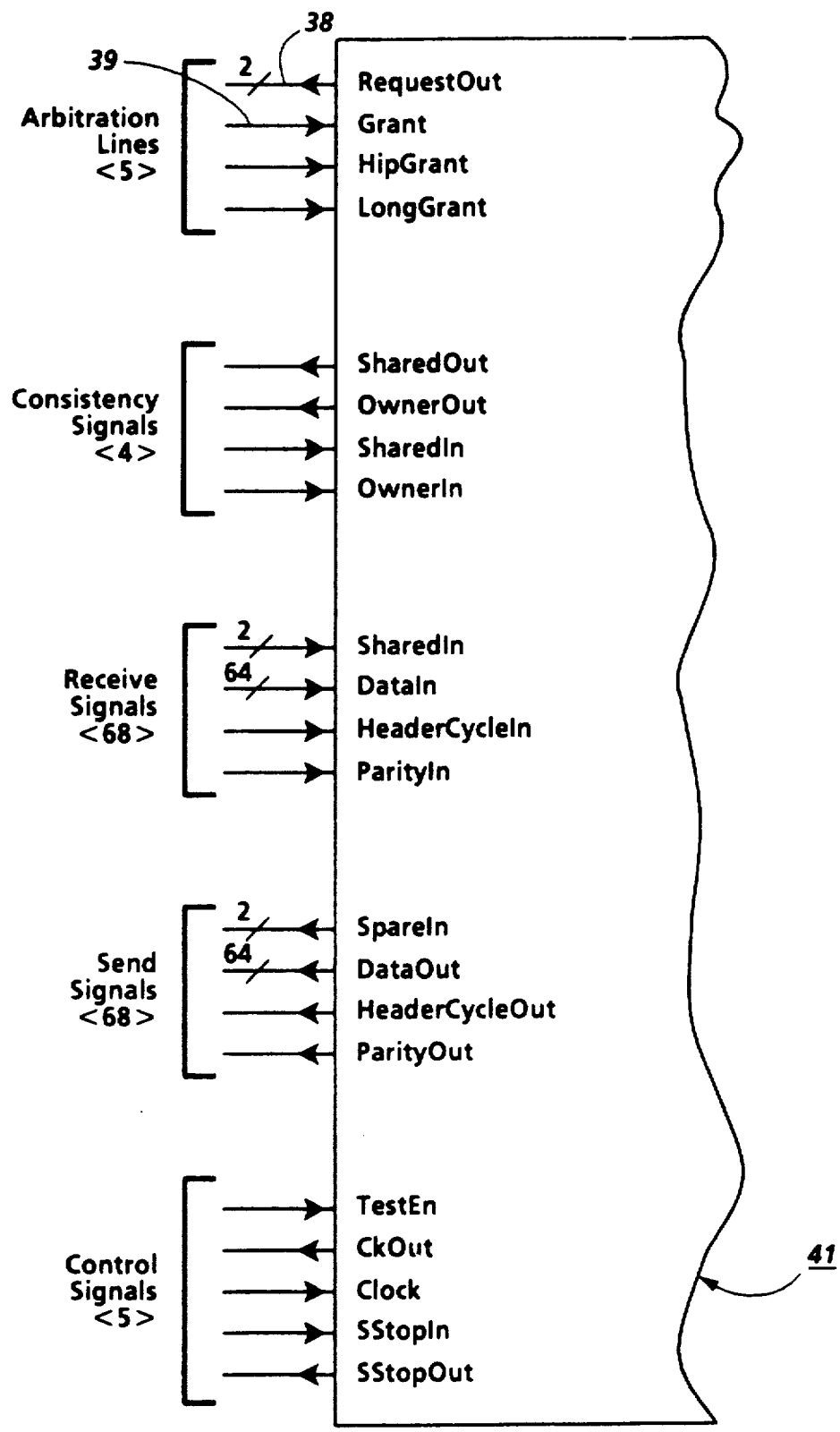
FIG. 4 is a functional diagram for identifying the various signal ports of the bus/client interface that is shown in FIG. 2.

As shown in FIG. 4, the bus interface 41 has a control port, an arbitration port, a receive port, a send port, and a consistency port. The host bus applies a clock signal to the control port of the interface 41 for controlling the timing of all interactions between the interface 41 and its associated bus client device and for providing a reference from which any other clocks that may be needed by the client device can be derived. The control port also includes an output for a synchronous stop output signal (SStopOut) and an input for a corresponding synchronous stop input signal (SStopIn), whereby the associated client device may assert SStopOut whenever it wants to bring the system to a synchronous stop. The assertion of SStopOut by any bus client causes a "true" SStopIn signal to be applied to all of the clients on the bus and to the arbiter for the bus, thereby halting all activity on the bus, until the client deasserts SStopOut.

2. Arbitration Interface

The arbiters 35a-35i and 36, time multiplex the busses 14a-14i and 26, respectively, among the client devices that are contending for them at any given time, thereby ensuring that each client has fair, bounded time access to its host bus. The client devices are coupled to the arbiter for their host bus by one or more dedicated request lines and by one or more dedicated grant lines.

In operation, a client device transmits a bus request to the arbiter for its host bus via its dedicated request line or lines in anticipation of outputting a request or a reply packet on its bus. In most cases, the arbitration request is transmitted after the client has fully assembled the request or reply packet on behalf of which the arbitration request is being made, but in some cases the arbitration request is registered with the arbiter while the client is still assembling the packet in order to reduce the client latency. For example, to reduce the latency of main memory 13, the memory controller 25 preferably registers its arbitration request for a ReadBlock reply (described in more detail hereinbelow) while it is retrieving the data that is to be included in the reply from the main memory 13.

As will be seen, each arbiter receives arbitration requests that have different priorities and that are made to acquire the bus for the transmission of packets of different lengths (e.g., an implementation of this initial embodiment utilizes 2 and 5 cycle long packets). Consequently, multiple arbitration request lines are favored (see FIG. 2 and 4) because they permit the client devices to encode their arbitration requests in just a few clock cycles (one cycle and two cycle arbitration requests are described hereinbelow with reference to this initial embodiment and to an enhanced embodiment, respectively), using an encoding that enables the arbiter to discriminate between arbitration requests of different priority and arbitration requests for the transmission of packets of different lengths. Any of the client device may have multiple arbitration requests pending with its bus arbiter at any instant in time. The arbiter, in turn, applies preselected arbitration rules for prioritizing the pending arbitration requests of the contending client devices and sequentially grants those requests in priority order by returning bus grant signals to one after another of the contending client devices via their dedicated bus grant line or lines. For example, the arbitration rules that govern whenever any one or more of the client devices have registered arbitration requests of different priorities with the arbiter for their host bus typically cause the arbiter to grant those requests in declining order of priority. On the other hand, multiple pending arbitration requests of the same priority from one or more of the client devices suitably are handled by employing a "round-robin" rule to arbitrate among the contending clients and a FIFO (first in/first out) rule to arbitrate between multiple requests of any given client.

Figure 5:
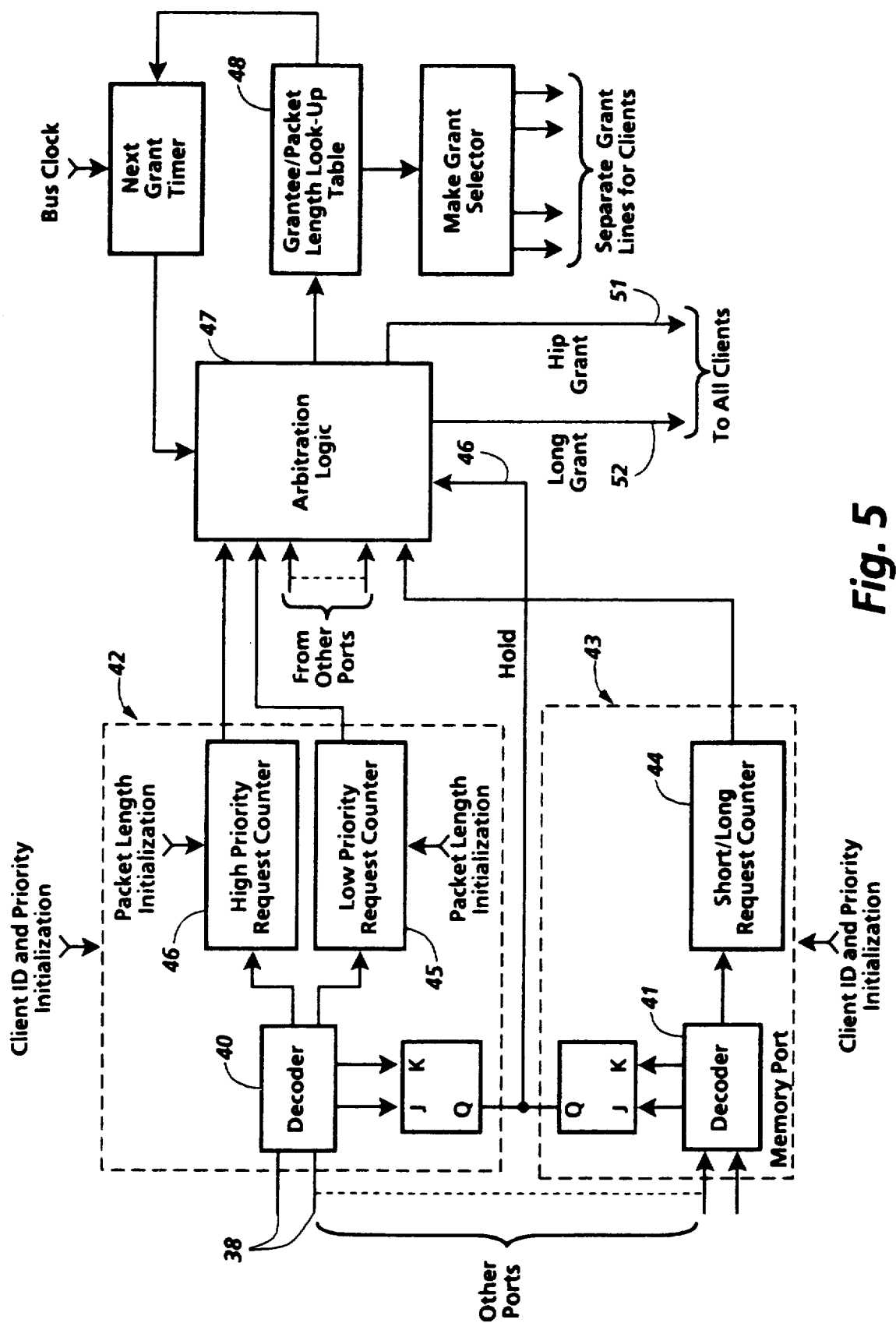
FIG. 5 is a functional block diagram of an arbiter for arbitrating a memory bus of the foregoing type in time overlapping relationship with the transmission of packets on the bus.

More particularly, as shown in FIG. 4, each client device has two arbitration request lines 38, and one grant line 39. The two request lines 38 enable the client to encode up to four different arbitration requests for decoding by the arbiter, as at 40 and 41 in FIg. 5. The arbitration requirements of all bus clients, except main memory controllers, can be satisfied by assigning the following meanings to those encodings:

| Encoding No. | Meaning |
| --- | --- |
| 0 | Release demand for system-wide hold. |
| 1 | Demand system-wide hold. |
| 2 | Add a low priority arbitration request. |
| 3 | Add a high priority arbitration request. |

All main memory arbitration requests are of the same priority, so the arbitration requests from main memory controllers suitably are interpreted as follows:

| Encoding No. | Meaning |
| --- | --- |
| 0 | Release demand for system-wide hold. |
| 1 | Demand system-wide hold. |
| 2 | Add a request for a short (2 cycle) packet. |
| 3 | Add a request for a long (5 cycle) packet. |

In practice, the foregoing interpretations of the arbitration requests are programmed into the arbitration ports of the arbiter during system initialization (by means not shown). Specifically, arbitration ports, such as the port 43, that are connected to memory controllers are programmed to function as so-called "memory ports," which means that they utilize a single FIFO request register and are assigned "memory priority" for both short and long reply packets (the only higher priority is "cache reply priority"). The other arbitration ports 42 are programmed to function as so-called "normal ports," which means that they utilize separate counters or registers for registering low and high priority requests. Thus, each of these normal arbitration ports 42 is further programmed with the length of the packets for which the associated client device makes its low and high priority arbitration requests.

A typical assignment of priorities to the arbitration requests that an arbiter may receive from the different types of client devices that it may be required to service is (in declining order of priority):

| Priority No. | Assignment |
| --- | --- |
| 0 | Cache reply priority. |
| 1 | Memory controller and I/O reply priority. |
| 2 | Display controller request high priority. |
| 3 | I/O request priority. |
| 4 | Cache request priority. |
| 5 | Display controller request low priority. |

As a general rule, a display controller (see 28$i$ in FIG. 1) utilizes its low arbitration priority to satisfy its request, so the display ordinarily is driven by data that is transferred to its controller during bus cycles that otherwise would be idle. If, however, the data queue for the display drops to a near empty level, the display controller employs its high priority request level for a few request packets to refill its data queue.

The two highest arbitration priorities are assigned to replies to reduce the number of pending replies. This is an important flow control mechanism for avoiding bus deadlock. It also reduces transaction execution delays (i.e., the time between the issuance of a request and the receipt of a responsive reply). However, the high priority that is given to replies increases the likelihood of a client device accumulating a sufficient number of transaction requests to put its transaction request register 34 (FIG. 2) at risk of overflowing. Therefore, to prevent such congestion, there is a second flow control mechanism that may be invoked by any client device to demand a system-wide hold of the arbiter. A demand for a system-wide hold temporarily disables the arbiter from granting the bus for the transmission of request packets, thereby causing the arbiter to dedicate the bus to the clients that are making arbitration requests for the transmission of reply packets. Once demanded, such a system-wide hold remains in effect until it is released by the client that demanded it. This enables the congested client to confirm that its pending request queue has dropped to a sufficiently low level to relieve the congestion before normal operation is resumed.

As will be understood from the foregoing, different client devices may have different levels of priority, but the allocation of the host bus is non-preemptive. As a result, a client device that has been granted its host bus is the "bus master" for a sufficient period of time to enable it to place a complete request or reply packet on the bus.

Figure 6:
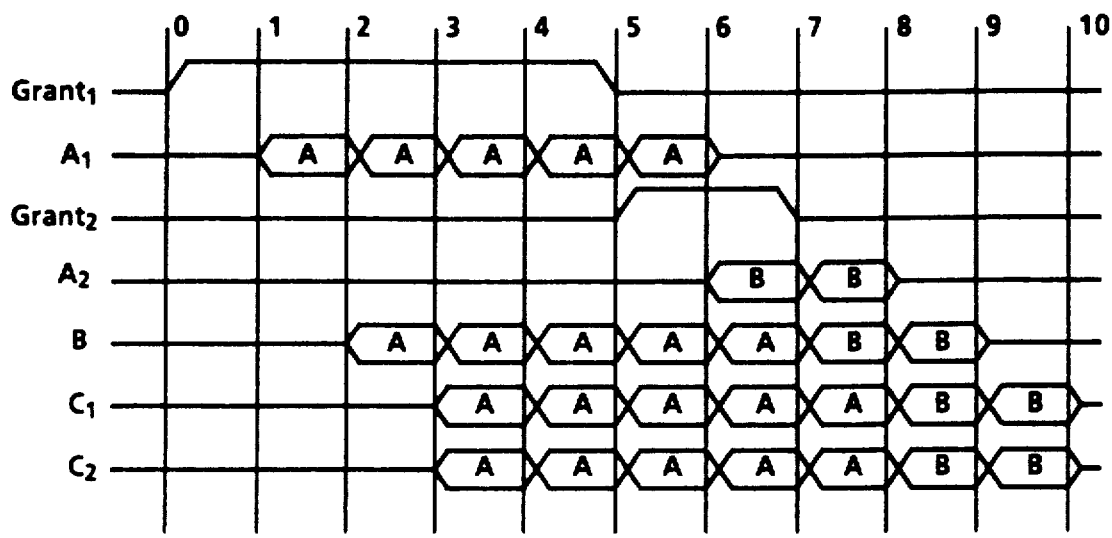
FIG. 6 is a timing diagram that illustrates the time overlap between the arbitration of the pipelined bus shown in FIG. 3B and the transmission of packets thereon.

However, it is to be understood that one of the important advantages of the encoding of the arbitration requests is that it enables the arbiter to determine predictively, for any given arbitration request from any given client, the length of the packet that the given client will be issuing when it is granted the bus in response to its given arbitration request. This permits the arbiter to self-limit the length of time that it grants the bus to any given client device to the exact number of bus cycles that the client requires for issuing its packet. Even more significantly, as shown in FIG. 6, it enables the arbiter to control the timing of successive grants, such as Grant$_1$ and Grant$_2$, so that the second grant (Grant$_2$) is issued just after the current bus master client evaluates its grant (Grant$_1$) for the final bus cycle of the packet A that it is issuing. This early grant notification affords the client that will become the next bus master adequate time to enable it to bring its bus drivers up to a suitably high voltage level for driving the bus with the header cycle for its packet B during the very first bus cycle following the final cycle of the immediately preceding packet A. Thus, it will be evident that the arbiter not only performs the bus arbitration in time overlapping relationship with the transmission of packets on the bus, but also permits the clients to fill all of the available bus cycles with packets.

Busses that are composed of a plurality of pipelined bus segments, such as shown in FIGS. 3A, 3B and 3C, must be designed with some care if it is desired to utilize predictive, overlapping arbitration of the foregoing type for permitting their clients to fill all of their available bus cycles with packets. Specifically, successive packets A and B can be packed into consecutive bus cycles on the middle or so-called "backpanel" segment of such a bus if and only if the backpanel segment is the only bidirectional segment of the bus. Otherwise, any attempt to pack the packets A and B into consecutive bus cycles will be defeated by the prohibition against time overlap between those two packets on any given bus segment. As shown in FIGS. 3A, 3B and 3C, the solution is to use unidirectional bus segments for all segments of such a bus, except for its backpanel segment. The efficacy of this solution is illustrated in FIG. 6, which tracks the packets A and B from the unidirectional output segments A$_1$ and A$_2$, respectively, of the bus shown in FIG. 3B, across its backpanel segment B, and then to its unidirectional input segments C$_1$ and C$_2$, respectively.

As shown, there are two additional wires, 51 and 52, that connect each arbiter to all of the client devices that it is responsible for servicing. In the cycle just preceding the grant of the bus to a given client device, the logic level of the signal on the so-called HIPGrant line 51 enables the client devices to determine whether the next grant will correspond to a high priority request or not, and the logic level of the signal on the so-called LongGrant line 52 enables the clients to determine whether the next grant will be for a long packet or not. These two signals, therefore, enable the clients to discriminate between grants for pending arbitration requests of different priority and between grants provided to permit the transmission of packets of different lengths.

3. Data/Control Interface

Returning for a moment to FIG. 1, the global bus 26 and each of the cluster busses, such as 14$a$–14$i$, are configured to provide a power of 2, denoted as $2^n$, bit-wide multiplexed data/address path. To connect client devices to unidirectional bus segments, the standard interface 41 (FIG. 4) has a send port and a receive port, each of which comprises a $2^n$ bit wide data/address path (in a typical implementation of this invention, the data/address path of each bus is 64 bits wide). However, the send port of the interface 41 can be operated in a bidirectional mode, so it is utilized as a send/receive (transceive) port for connecting client devices to bidirectional bus segments.

As shown, the send and receive port also include a wire for a header cycle bit, and a wire for a parity bit. In this embodiment, a HeaderCycle logical true ("1") signal is asserted during the first cycle of each packet by the bus master (i.e., the client issuing the packet) to identify the header cycle of the packet. Parity, on the other hand, is computed at the data source from the data that is carried by the associated packet to enable the receiver to detect data transmission errors. This parity checking is entirely conventional, so it suffices to note that even parity is employed because the bus idle logic level in this particular implementation is low ("0").

4. Consistency Port

To maintain data consistency across all cached copies of each of the memory addresses that is cached within any two or more of the cache memory clients on any given bus at any given time, the bus-device interface 41 has inputs 61 and 62 for receiving SharedIn and OwnerIn signals, respectively, from memory controllers (including controllers for intermediate or higher level caches), together with outputs 62 and 63 for transmitting SharedOut and OwnerOut signals, respectively, from cache memories.

A true (logical "1") SharedOut signal state is asserted, after a fixed delay, by a cache whenever it already contains an address to which a cache requestor on the same bus issues a memory request (e.g., WriteSingle, ConditionalWriteSingle or ReadBlockRequest in this implementation). SharedIn, on the other hand, is a suitably delayed logical OR of the SharedOut signals from all of the caches on the bus. The delay caused by this logical OR operation also is fixed, so the responder evaluates the SharedIn signal level a predetermined time after it receives such a request packet to determine whether the address specified by the requestor was shared by any of the other caches on its bus when they received the request. As will be seen, this SharedIn signal value is returned to the requestor when the responder issues its reply by a so-called "replyShared" bit in the header cycle of the reply packet, thereby informing the requestor whether the data to which its request was directed was shared or not when it made its request.

A true (logical "1") OwnerOut signal state is asserted, after a fixed delay, by a cache whenever it is the "owner" of the data block residing at the address specified in a read request (e.g., a ReadBlockRequest) that it receives from another cache. As described in more detail hereinbelow, a cache becomes the "owner" of a data block whenever it writes data into that particular data block. This means that the ownership, if any, belongs to the cache that last wrote into the data block, so there is no more than one "owner" at a time of any given data block. Nevertheless, to simplify the timing, the OwnerIn signal preferably is a similarly delayed logical OR of the OwnerOut signals from the caches on the bus, so that the uppermost client on the bus (i.e., the memory controller or a higher level cache) can evaluate OwnerIn at the same time that it is evaluating SharedIn to determine whether it should issue the reply or defer in favor of having the reply come from a lower level cache "owner" of the data. As will be appreciated, the ORing of the OwnerOut signals from the caches is not essential because no more than one Cache can assert OwnerOut, but it results in uniform treatment of the SharedIn and OwnerIn values.

It is noteworthy that the SharedIn and OwnerIn signal values are computed by logical ORs, rather than by wire-ORing. This permits pipelining of SharedIn and OwnerIn, while avoiding electrical constraints on their timing and interpretation. It also permits parity checking of the SharedOut/SharedIn and OwnerOut/OwnerIn signal values it desired (see the discussion of this option in the following description of the enhanced embodiment).

E. Transactions

Transactions are the uppermost layer of the bus protocol. Each transaction is composed of a request packet and a reply packet, which are independently arbitrated. A transaction begins when the requestor registers an arbitration request with the arbiter for its bus, but the request packet is stored by the requestor in its request register 28 until the arbiter grants it the bus. When that occurs, the requestor issues its request packet one cycle at a time during consecutive bus cycles.

The first cycle of a request packet, which is called the "header cycle," contains all of the information that is needed to identify the requestor and the transaction the requestor is initiating. It also includes sufficient information for selecting the client device or devices that need to participate in the transaction to bring it to a successful conclusion. Subsequent cycles of the request packet generally contain data that is dependent on the transaction that is to be performed. All client devices (including the requestor) receive the request packet, and each of them examines its header cycle to determine whether it is required to participate in the transaction or not.

As a general rule, a substantial number of the bits of the header cycle of each request packet are reserved for an address that is issued by the requestor to select a memory location or an I/O device register. Although the mechanism by which devices are selected to participate in a transaction may differ for different transactions, most transactions utilize the address that is contained in the header cycle as the selection mechanism.

Figure 7:
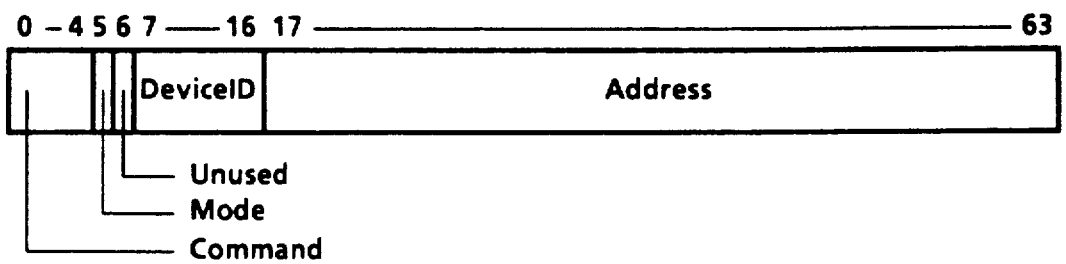
FIG. 7 is a bit-level diagram of the header cycle of a request packet for a bus transaction in a format selected for an initial embodiment of this invention.

More particularly, referring to FIG. 7, in this embodiment forty-seven bits of the header cycle of each request packet are allocated to an address field (this implementation currently employs only thirty-two of these bits, so the other fifteen bits are available for future extensions, which means that these unused bits must be checked when reading the address field to confirm that they are all "0"). Ten of the other bits are reserved for carrying a so-called "DeviceID," which is a unique identifier that each client device is assigned (suitably, these DeviceIDs are assigned during system initialization by means not shown). Furthermore, five of the remaining bits of the request header cycle are used for encoding transaction commands. And still one more bit is used for protective "mode" checking by the client devices (this mode checking enables the client devices to determine whether the requestor is authorized to initiate the specified transaction, but such mode checking is beyond the scope of this invention). Accordingly, in this particular implementation, the request header cycle has only one unallocated bit.

No more than one client device replies to any given request, although more than one client may change its internal state upon receiving the request packet. The responder first partially or completely assembles the reply and then registers a bus arbitration request with the arbiter for its bus. Thereafter, upon being granted the bus, the responder sends its reply packet one cycle at a time during consecutive bus cycles, starting again with a header cycle which is followed by one or more data cycles. For example, a 64 bit-wide bus supports a data transfer unit of eight octets (eight bit bytes) on each data cycle. These bytes, in turn, may be organized into words of various lengths to implement a variety of different word-based software architectures.

Figure 8:
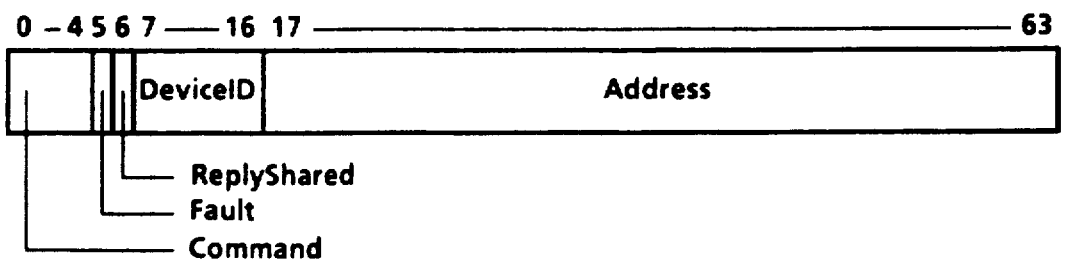
FIG. 8 is a bit-level diagram of the header cycle of a correspondingly formatted reply packet.

As shown in FIG. 8, the header cycle of each reply packet replicates the transaction identifying bits of the encoded command that was received from the requestor, the address specified by the requestor, and the DeviceID of the requestor. Typically, the responder simply strips this information from the header cycle of the request packet and then stores it for use in constructing the header cycle of the reply packet. This information not only uniquely identifies the transaction to which the reply packet relates, but also unambiguously links the reply packet to the transaction requestor.

Considering the header cycle of a typical reply packet in some additional detail, it will be observed that it suitably is bit-by-bit identical to the header cycle of the corresponding request packet, with the following exceptions: (1) a request/reply flag bit is inverted to indicate that the packet is a reply; (2) the mode bit of the request header is used as a fault bit in the reply header to indicate whether the responder encountered a fault or not while assembling the reply; and (3) the unused bit of the request header is employed as a replyShared bit to indicate whether the datum at the address specified for the transaction was shared by multiple caches or not at the time that the responder received the request packet for the transaction. The function of the reply-Shared bit is described more fully hereinbelow. However, it is appropriate to note at this point that the responder drives the fault bit to a true ("1") logic level state only when it encounters a fault, so this bit effectively notifies the requestor whenever such a fault occurs, thereby causing the requestor to prepare itself to receive a fault code (which suitably is transmitted in the thirty-two lower order bits of the second cycle of the reply packet). Fault detection and fault code generation are outside the scope of this invention.

As before, all client devices examine the header cycle of the reply packet to determine whether any action is required of them. In operation, the DeviceIDs are relied on to disambiguate the replies amongst the different client devices. Some clients, however, may have multiple outstanding or pending requests. Thus, replies suitably are further disambiguated within each of those clients, either by assigning multiple DeviceIDs to the clients or by making some other suitable provision for enabling them to disambiguate the replies to their outstanding requests.

A transaction is complete when the requestor receives a reply. In most cases, the bus protocol of the present invention results in a one-to-one correspondence between requests and replies. However, some request packets may not have a corresponding reply packet and vice versa, either because of the implementation of the bus protocol or because of errors and the like. Thus, the protocol does not depend on the request/reply pairing as being an invariant. Instead, it merely requires that all client devices on any given bus service the request packets that require action from them in arrival order. As will be seen, this requirement is central to maintaining data consistency.

A table summarizing the command encodings and the packet lengths of the request/reply pairs for the transactions that have been defined for this initial embodiment is set forth below:

| Transaction Pairs | Abbr. | Encoding | Length |
|---|---|---|---|
| ReadBlockRequest | RBRqst | 0000 0 | 2 |
| ReadBlockReply | RBRply | 0000 1 | 5 |
| Write Block Request | WBRqst | 0001 0 | 5 |
| WriteBlockReply | WBRply | 0001 1 | 2 |
| WriteSingleRequest | WSRqst | 0010 0 | 2 |
| WriteSingleReply | WSRply | 0010 1 | 2 |
| ConditionalWriteSingleRequest | CWSRqst | 0011 0 | 2 |
| ConditionalWriteSingleReply | CWSRply | 0011 1 | 5 |
| FlushBlockRequest | FBRqst | 0100 0 | 5 |
| FlushBlockReply | FBRply | 0100 1 | 2 |
| Undefined | | 0101 0 | |
| Undefined | | 0111 1 | |
| IOReadRequest | IORRqst | 1000 0 | 2 |
| IOReadReply | IORRply | 1000 1 | 2 |
| IOWriteRequest | IOWRqst | 1001 0 | 2 |
| IOWriteReply | IOWRply | 1001 1 | 2 |
| BIOWriteRequest | BIOWRqst | 1010 0 | 2 |
| BIOWriteReply | BIOWRply | 1010 1 | 2 |
| MapRequest | MapRqst | 1110 0 | 2 |
| MapReply | MapRply | 1110 1 | 2 |
| DeMapRequest | DeMapRqst | 1111 0 | 2 |
| DeMapReply | DeMapRply | 1111 1 | 2 |

As will be seen, there are three general types of transactions: (a) memory transactions for performing memory access operations while maintaining cached data consistency, (b) I/O transactions for performing programmed I/O operations, and (c) miscellaneous transactions for implementing still other functions. As will be appreciated, the extremely compact and efficient encoding of the transactional commands is practical because the logic level ("0" or "1") of the request/reply flag bit (i.e., the fifth bit of the command field as shown in the foregoing table) is sufficient to indicate whether any given packet is a request or a reply. Up to sixteen different commands can be encoded using this command field format, so it will be understood that the above-defined transactions only partially exhaust the command field capacity. Of course, the excess capacity of the command field may be utilized, if desired, to define further transactions for implementing additional features.

1. Memory Related Transactions

Memory transactions are employed for transferring data back and forth between processors and memory, as well as between I/O devices and memory. More particularly, ReadBlock is invoked by a cache requestor to read a data block from the main memory 13 or from another cache, depending on whether a version of the desired data block is cached elsewhere in the memory system and, if so, on whether the cached version is "owned" or not. FlushBlock can be invoked by a cache requestor for writing a owned data block (i.e., a block of data that has been modified most recently by a locally initiated write- i.e., a write initiated by a processor in the same branch of the memory tree) back to the main memory 13. And, WriteBlock is available for enabling secondary data sources (i.e., data procedures that are external to the memory system) to write data blocks directly into the main memory 13, as well as into any intermediate level caches 19a-19i and any first level caches 16aa-16aj (see FIG. 1) that match on the address specified for the transaction. In other words, this WriteBlock transaction permits new data to be introduced into the primary memory system of the multiprocessor 11, without having to route such data through a cache.

Figure 9:
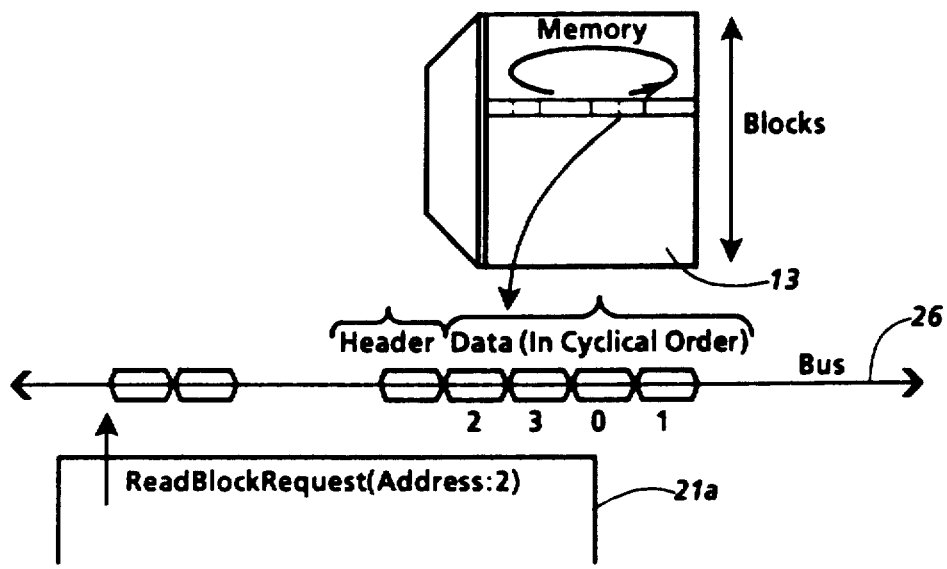
FIG. 9 illustrates the cyclical reordering of a data block transport unit on a bus for causing the addressed quantum of the data block to be contained within the first data cycle of the transport unit.

All of these "block" transactions span a plurality of contiguous words, such as four 64-bit words which are serially aligned in physical address space so the address of the first individually addressable quantum within any such data block is 0 mod N, where N is the number of individually addressable quanta contained within each data block. Advantageously, all block data transfers on each bus are organized so that the addressed quantum appears in the first data cycle on the bus, followed by the remaining quanta of the data block in cyclical order. See FIG. 9. This minimizes the memory latency for retrieving the datum from the specified address, which is especially desirable in the event of a cache "miss."

WriteSingle is a transaction which is invoked by a cache requestor for updating multiple cached copies of shared data, without necessarily affecting the main memory 13. This transaction can be invoked only by a cache that contains a copy of the affected data block. ConditionalWriteSingle is a closely related, optional transaction that a cache requestor can invoke for performing atomic read-modify-writes to such shared data.

2. I/O Transactions

I/O transactions allow processors to transfer data to and from I/O devices, such as the LAN controller 29$i$ in FIG. 1. The address space employed for these I/O transactions (i.e., "I/O space") is totally disjoint from the address space used for memory transactions (i.e., "memory space"), so a given valid address is either in memory space or in I/O space, but not in both. As will be seen, I/O transactions have no bearing on data consistency, and the data consistency protocol has no bearing on the I/O transactions.

IORead, IOWrite and BIOWrite transactions have been defined in this embodiment for performing I/O operations. Each I/O device is allocated a unique portion of a common address space, and these transactions are issued to that address space. Thus, the I/O devices, such as the controller 29$i$ in FIG. 1, are free to interpret the I/O commands that are addressed to them as required to enable them to effectively participate in the desired transaction. The IORead and the IOWrite transactions are initiated by cache requestors to read and write addressable quanta from and to, respectively, specified I/O addresses. BIOWrite also is a cache initiated transaction for writing a single addressable quantum to the I/O address space, but it differs from the IOWrite transaction because it permits the data to be written simultaneously into multiple instances of a given "device type." Thus, while BIOWrite is not an unrestricted global broadcast transaction, it is a broadcast to all devices of a given type. The definition of "device type" is system dependent and is beyond the scope of this invention.

Turning for a moment to the I/O bridge that is shown at 18$i$ in FIG. 1, it is to be understood that it is a hybrid device insofar as the memory system is concerned. More particularly, this I/O bridge device 18$i$ is useful for giving an aysnchronous I/O device, such as the memory bus of a foreign computer system, direct access to the memory system of the multiprocessor 11 via a cache 60 that is functionally similar to the caches 16$aa$-16$ij$. To that end, the bridge 18$i$ includes provision (not shown) for buffering memory reads and writes issued by such an I/O device and for translating those reads and writes into defined memory transactions. However, it also responds to I/O transactions within a portion of the I/O space, which means that the processors 12$aa$-12$ij$ can access the internal resources of the I/O bridge 18$i$ and the registers of the I/O devices to which the bridge 18$i$ is connected.

The allocation of I/O address space is non-trivial only because the I/O address space size requirements of the different I/O devices that may be connected to one or another of the busses of the multiprocessor 11 differ substantially. Therefore, as a practical matter, these differences should be taken into account while allocating the I/O address space to ensure that the I/O address space allocation for each I/O device is a reasonable approximation of the address space the device is likely to need.

3. Miscellaneous Transactions

Map and DeMap are cache invoked transactions for carrying out high speed virtual-to-physical address space mapping in the virtual memory environment of the multiprocessor 11. To that end, Map permits a cache requestor to read a virtual page-to-physical page mapping entry from a map cache, such as at 17$a$ in FIG. 1. DeMap, on the other hand, enables a cache requestor to invalidate a cache resident virtual-to-physical address map for any specified page of virtual address space.

F. Data Consistency

It is essential in a shared memory multiprocessor environment for all bus clients to have access to the same sequence of data values for any given address in the memory space. This is referred to as "data consistency." The use of separate cache memories for the individual processors of such a multiprocessor complicates the problem of maintaining this data consistency, especially in larger systems where the potential number of copies of a given address that may exist within the caches at any given time is large.

However, an especially efficient data consistency protocol can be implemented by employing so-called write back caches (i.e., caches that update cached data in accordance with data writes issued by processors, without immediately updating main memory) for initiating and executing the memory transactions that are required by the processors 12$aa$-12$ij$ and by the I/O bridge 18$i$ (FIG. 1). These caches may fetch and store data as needed from all addresses in the memory space, because the external consistency of multiple copies of the data at any given address within the memory space is maintained automatically and transparently by the hardware through the use of certain of the above-described transactions. Moreover, I/O devices are permitted direct access to the memory space, while preserving a consistent view of memory for the processors 12$aa$-12$ij$ and for the I/O bridge 18$i$.

More particularly, as explained in even further detail hereinbelow, the caches 12$aa$-12$ij$, 19$a$-19$i$ and 60 detect when a datum becomes shared by directly or indirectly monitoring the traffic on their respective host busses, and they perform a broadcast write whenever any processor (or the I/O bridge 18$i$) updates a shared datum value in the memory space. All of the caches 12$aa$-12$ij$ and 60 are "snoopy caches," which means that they monitor all of the traffic on their busses.

1. Data Consistency in Single-Level Systems

As previously pointed out, a single level system is composed of one or more processors, such as the processors 12$aa$-12$aj$ in FIG. 1, which are connected to their memory bus 15$a$ through respective caches 16$aa$-16$aj$, together with a shared main memory. Being that the processors 12$aa$-12$aj$ access main memory through their caches 16$aa$-16$aj$, respectively, it will become evident that it is sufficient to maintain data consistency between all cached copies of any given address. This means that the main memory copy of an address that is cached can be stale with respect to the cached copy or copies, without risk of computational errors being caused by this stale main memory data.

To maintain data consistency, the consistency protocol relies upon each cache keeping two status bits, "shared" and "owner," for each data block that it is caching, together with a pendingState for any data block that is subject to a transaction that is pending on the bus at the request of that particular cache. In addition, the caches 16aa–16aj conventionally maintain a "Valid" state bit for each of their data blocks to distinguish between currently cached data blocks and deleted or "empty" data blocks that can be overwritten.

The state of the shared bit indicates whether there possibly are multiple cached copies of the associated data block or not. This is a conservative indication because the shared bit is affirmatively set to a true ("1") state if there are multiple cached copies, but is not necessarily reset to a false ("0") state if there is only one cached copy. The owner bit for a data block, in turn, is set to a true ("1") state in a given cache if and only if the processor or other device that communicates with the bus through the given cache was responsible for performing the most recent (i.e., last) write into that particular data block. This means that there is no more than one cache "owner" of a given data block at any instant in time on any given bus, even if one or more of the other caches on the bus also contain a copy of that same data block. Additionally, the pendingState that a cache maintains for each transaction that it has pending on the bus enables the cache to correctly compute the value for its shared bit for the data block to which the transaction pertains when it receives the reply, even if the number of cached copies of that data block changes while the transaction is still pending. This pendingState information also enables the cache to identify intervening transactions that can modify the value of the datum at the address specified by its pending transaction, so that the cache can take appropriate action to obtain the correct datum value for that transaction, as more fully discussed hereinbelow.

As a general rule, a first level cache initiates a ReadBlockRequest whenever its associated processor issues a fetch or store command to an address that causes a "cache miss" to occur (i.e., whenever the address to which such a command is issued is not in the cache). If necessary, the cache may also initiate a FlushBlock for writing data from the cache to main memory, thereby freeing storage space within the cache for storing new data (as will be recalled, only data blocks that have their owner bit set are written out by FlushBlock to avoid writing stale data into main memory). Furthermore, a cache initiates a WriteSingle transaction (this is the aforementioned write that distinguishes the consistency protocol from the minimum set of operations that would be needed if data consistency could be ignored) whenever its associated processor writes into a data block that has its shared bit set ("1").

All caches, including the requestor, attempt to match the addresses specified in the header cycles of any RBRqst, WSRqst, WSRply, CWSRqst, CWSRply, and WBRqst packets (i.e., the packets that may affect the value and/or the not-shared status of the datum at the specified address). The pendingState that the requestor maintains for each of its pending transactions includes the address of the data that is subject to the transaction for enabling the requestor to detect intervening packets of the foregoing type that specify the same address, together with a shared status that is cleared to a false ("0") state when the requestor receives its own request packet. This enables the requestor to set its shared status for any data block that is subject to one of its pending transactions to a true ("1") state if that particular data block becomes shared while the transaction is pending. Furthermore, as described in some additional detail hereinbelow it also enables the requestor to take suitable corrective action if the value of the datum that is subject to the pending transaction is changed while the transaction is pending.

All caches, other than the requestor, simply match the addresses specified in the header cycles of the above-enumerated packets against the addresses of the data blocks they are caching to determine whether they contain the specified address or not. No such matching is required for either a FBRqst packet or a FBRply packet, because the FlushBlock transaction is used only for writing data blocks from the caches to main memory, without requiring notification of the other caches that such action is being taken. Likewise, no address matching is necessary for a WBRply packet because it simply provides an acknowledgement that memory has processed the corresponding WBRqst packet. Furthermore, a RBRply is relevant only to the requestor, so the other caches may ignore such a packet.

Each cache, except the requestor, that successfully matches the address specified in the header cycle of a RBRqst, a WSRqst, or a CWSRqst packet asserts SharedOut at the consistency port of its bus interface 41 (FIG. 4), thereby signaling that the data block at that particular address is shared. Such a cache also sets the shared bit for its copy of the specified data block to a true ("1") state, if it has not previously been so set. As will be recalled, headers of all request and reply packets carry DeviceIDs (see FIGS. 7 and 8) that enable the bus clients to determine whether they are the requestor or not for any given packet.

Figure 10:
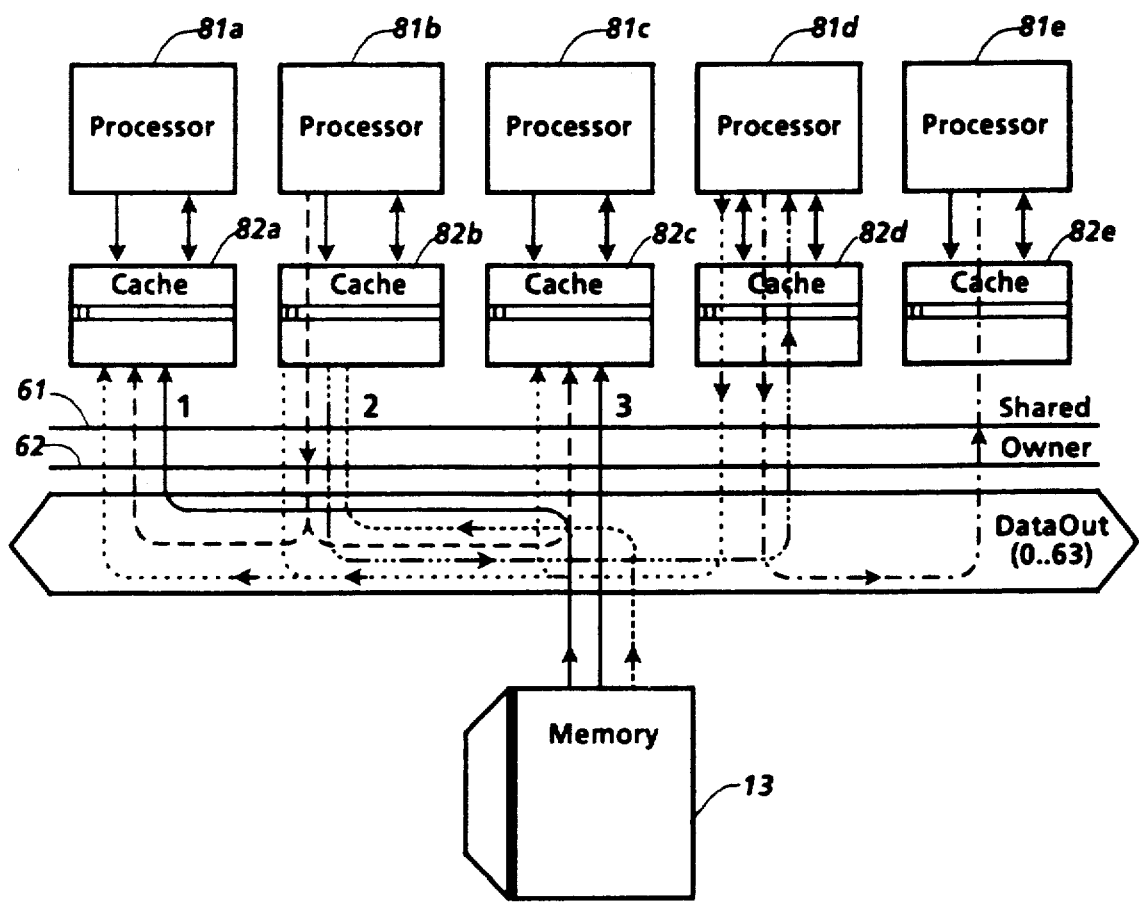
FIG. 10 is a simplified schematic diagram of a single level shared memory multiprocessor that is useful for illustrating the basic principles of the data consistency protocol that has been provided for the initial embodiment of this invention.

As will be appreciated, the assertion of SharedOut by any of the caches on the bus is sufficient to cause the replyShared bit to be set to a true ("1") state in the header cycle of the corresponding reply packet, regardless of whether the reply is supplied by a cache owner of the data block or by main memory 13(in the absence of a cache owner). This follows from the fact that the SharedOut signals from the caches are logically ORed (by means not shown) to compute the value of the SharedIn signal that is applied to the consistency ports of all of the bus client interfaces 41 via a shared line 61 (FIG. 10).

The requestor, on the other hand, ORs the replyShared bit that it receives in the header cycle of the reply to its pending transaction with the shared bit that it maintains in its pendingState for the transaction. Thus, the requestor's shared bit for its copy of the specified data block is set to a true ("1") when it receives its reply either if the data block existed in another cache when the requestor issued its request packet or if the data block was copied into another cache while the requestor was awaiting its reply.

A requestor that issues a WSRqst or a CWSRqst sets or resets its shared bit for its copy of the data block to which the transaction pertains depending on the state of the replyShared bit in the header cycle of the corresponding reply packet (see FIG. 8) that it receives and the shared status of its pendingState when that reply is received. If both the replyShared bit in the header of the reply is false ("0") state and the shared status in its pendingState for the transaction is false ("0"), the requestor has confirmation that no other cache contains a copy of the data block into which it is writing. Accordingly, the requestor then resets its shared bit for the specified data block to a false ("0") state, thereby ensuring that the shared bit is eventually cleared when the status of a data block changes from a shared to a not shared state.

The manipulation of the owner bits that the caches maintain for the data blocks they are storing is even more straightforward. Briefly, a cache sets its owner bit for a data block whenever it writes into the data block on behalf of its processor. Conversely, a cache clears or resets its owner bit for a data block whenever the data block contains an address that causes the cache to successfully match on the address specified in a WSRply or a CWSRply for a WriteSingle or a ConditionalWriteSingle transaction requested by any other cache. WriteSingle and ConditionalWriteSingle are fully equivalent insofar as the data consistency protocol is concerned, so it will be understood that the following description of the effect of a WriteSingle transaction on the shared and owner bits applies equally well to a ConditionalWriteSingle.

As previously pointed out, the processors store data in the shared memory system by writing data into the data blocks that are residing in their respective caches. If a processor issues a store command for storing a given datum value in a word or other addressable quantum of one of the data blocks that is residing within its associated cache while the shared bit for that data block is reset to a false ("0") logic level, the processor immediately updates the appropriate portion (e.g., word) of the cached data block and simultaneously sets the owner bit for that data block. On the other hand, if the shared bit for the data block to which processor store command is directed is set to a true ("1") logic level, the cache suspends the execution of the store command and issues a WSRqst packet which (a) identifies the physical address to which the processor has directed its store command (this physical address typically is determined by translation of the virtual address provided by the processor), and (b) contains the datum value that the processor has provided.

All WSRply packets come from the memory controller in a single-level system. Moreover, a WSRply packet replicates both the physical address and the datum value of the corresponding WSRqst packet. Thus, upon receiving its WSRply packet, the cache requestor not only executes the data store for its processor, but also sets its owner bit for the data block into which the processor data is written to a true ("1") state. Any of the other caches that match on the address specified in the header cycle of this WSRply packet (a) update their copies of the datum to which the reply packet is addressed based on the datum value that is provided by the reply packet, and (b) reset their owner bits for the data block that has been updated to a false ("0") state. As will be appreciated, this ensures that no more than one cache will assert ownership of any given data block during any given bus cycle. It also means that there is no assertion of ownership by any of the caches for any cached data block that has not been written into since it was read from main memory.

In view of the foregoing, it will be understood that when a cache requestor issues a RBRqst packet on its bus for a data block at a specified address, the data block may or may not be owned by another cache on the bus. If, however, one of the other caches owns the specified data block, the owner (and possibly one or more of the other caches) will match on its address, thereby causing each of them to assert SharedOut. Furthermore, the owner also will assert OwnerOut, thereby causing the logical OR's of the OwnerOut signals to drive the OwnerIn line 62 (FIG. 10) to a true ("1") state. The true ("1") state of the OwnerIn signal prevents the main memory from responding to the RBRqst, so the responsibility for supplying the corresponding RBRply packet is transferred to the cache owner of the specified data block. On the other hand, if none of the caches asserts ownership of the specified data block (i.e., if the OwnerIn signal is false ("0"), main memory supplies the RBRply, even if the data block is shared.

As previously mentioned, the packet switching of the bus creates a risk that the ownership of a data block will change after a requestor has issued a RBRqst, but before it has received the corresponding RBRply. For example, a cache may issue a RBRqst for a data block that is owned by main memory at the time that the request is issued. However, a short time earlier, some other cache may have issued a WSRqst to write new data into that very same data block. The risk then is that the WSRply packet will be issued by the memory controller prior to the RBRply packet because the memory services request packets in arrival order. If that occurs, the cache that initiated the Write Single transaction will become the owner of the data block Notwithstanding this intervening change in the ownership of the data block, main memory 13 (FIG. 1) still will supply the RBRply when it is ready to do so, because the cache owner was not prepared to assert its ownership of the specified data block when it received the RBRqst. This means that the data provided by this RBRply packet is stale. Therefore, to avoid taking stale data, the ReadBlock requestor uses its pendingState for its RBRqst to either compute the correct value for the requested data block or to initiate a retry of the ReadBlock after it receives the RBRply to its original RBRqst. The packets that a ReadBlock requestor needs to take into account while its request is pending to avoid utilizing stale data are those that modify the data (WSRply, CWSRply, and WBRqst) to which its RBRqst packet is addressed.

WriteBlock transactions are similar, but not identical, to FlushBlock transactions insofar as the memory system is concerned. Caches ignore FBRqsts, but not WBRqsts. Instead, any cache that matches on the address specified by a WBRqst, overwrites its address matching data block with the data contained by the WBRqst packet and resets or clears its owner bit for that data block to a false ("0") state.

A brief example will add some useful perspective to the foregoing description of the single-level consistency protocol. As will be seen, the example that follows describes a sequence of events for a specified memory location (address 73), starting from the state where none of the five caches 82a–82e in the shared memory system 83 shown in FIG. 10 has the data block containing that address. For convenience, the reference numerals that are used in this example correspond to the reference numerals that are used in FIG. 10:

1.
   a. Processor 81a reads address 73.
   b. Cache 82a misses and does a ReadBlock on the bus 85.
   c. Main memory 86 provides the requested data.

d. The state bits for the cached copy of the data block are: $Shared_{82a}=0$ and $Owner_{82a}=0$.

2.
   a. Processor 81b reads address 73.
   b. Cache 82b misses and does a ReadBlock on the bus 85.
   c. Cache 82a sets its Shared bit for the data block containing address 73 to a true ("1") state and also asserts SharedOut, so the SharedIn line 61 is driven to a true ("1") state after a predetermined delay.
   d. Memory 86 still provides the data.
   e. The state bits for the cached copies of the data block are: $Shared_{82a}=Shared_{82b}=1$; $Owner_{82a}=Owner_{82b}=0$.

3.
   a. Processor 81c reads address 73.
   b. Cache 82c misses and does a ReadBlock on the bus 85.
   c. Cache 82a and cache 82b assert SharedOut, thereby again causing the SharedIn line 61 to be driven high ("1").
   d. Memory 86 still provides the data.
   e. The state bits for the cached copies of the data block now are: $Shared_{82a}=Shared_{82b}=Shared_{82c}=1$; $Owner_{82a}=Owner_{82b}=Owner_{82c}=0$.

4.
   a. Processor 81b writes address 73.
   b. Because the data is shared, cache 82b does a WriteSingle on the bus 85.
   c. Cache 82a and cache 82c assert SharedOut, so the SharedIn line 61 is driven high.
   d. Cache 82a, cache 82b, and cache 82c update their values at address 73, but memory 86 does not.
   e. Cache 82b becomes owner of the data block containing address 73 ($Owner_{82b}=1$), but the shared and owner state bits for the cached copies of the data block otherwise are unchanged.

5.
   a. Processor 81d reads address 73.
   b. Cache 82d misses and does a ReadBlock on the bus 85.
   c. Cache 82a, cache 82b, and cache 82c assert SharedOut to signal SharedIn on line 61.
   d. Cache 82b asserts OwnerOut, thereby causing the OwnerIn line 62 to be driven to a true ("1") state after a predetermined delay. This inhibits main memory 86 from responding. Instead, the data block is provided by its owner cache 82b.
   e. Cache 82d marks its copy of the data block as $Shared_{82d}=1$, $Owner_{82d}=0$. The shared and owner state bits for the cached copies of the data block otherwise are unchanged.

6.
   a. Processor 81d now writes address 73.
   b. Because the data is shared, cache 82d does a WriteSingle on the bus 85.
   c. Cache 82a, cache 82b and cache 82c assert SharedOut, so the SharedIn line 61 is again driven high ("1").
   d. Ownership of the data block containing address 73 changes from cache 82b to cache 82d ($Owner_{82b}=0$, $Owner_{82d}=1$). The shared and owner state bits for the cached copies of the data block otherwise are unchanged 7.
   a. Processor 81e writes address 73.
   b. Cache 82e misses and does a ReadBlock on the bus 85.
   c. Cache 82a, cache 82b, cache 82c and cache 82d assert SharedOut, thereby causing the SharedIn line 61 to be driven to a true ("1") state after the aforementioned delay.
   d. Cache 82d, the current owner of the data block containing address 73, asserts OwnerOut, so it causes the OwnerIn line 62 to be driven high ("1") to inhibit memory 86 from supplying the data in favor of doing so itself.
   e. Cache 82e marks its state bits for its copy of the data block as $Shared_{82e}=1$, $Owner_{82e}=0$.
   f. Cache 82e then does a WriteSingle to address 73 because the data is shared.
   g. Cache 82a, cache 82b, cache 82c, and cache 82e assert SharedOut, thereby driving the SharedIn line 61 to cause the replyShared bit in the WSRply header to be set to a true ("1") state.
   h. Ownership of the data block containing address 73 switches from cache 82d to cache 82e ($Owner_{82d}=0$, $Owner_{82e}=1$). Otherwise, the shared and owner state bits for the cached copies of the data block remain unchanged.

2. Data Consistency in Multilevel Systems

As will be recalled, a two-level memory system is composed of a plurality of one-level memory systems 14a–14i (FIG. 1), called "clusters," which are connected to a main or global bus 26 via second-level caches 19a–19i, respectively. In other words, each cluster contains a single second-level cache that connects the cluster to the global bus 26, together with a private bus that connects the second-level cache to the first-level caches in the cluster. This private cluster bus is electrically and logically distinct from the other cluster busses and from the global bus. Main memory 13 is connected to the global bus 26.

At the cluster bus level of such a memory system, the second-level cache has the functional attributes of main memory. On the other hand, at the global bus level, the second-level caches function in essentially the same way as the caches within a single-level system. As will be seen, the design of the bus protocol and the data consistency protocol operate to prevent the first-level caches from discovering whether they are operating in a one-level or a multilevel memory system. In other words, the responses that the first-level caches receive from their environment are the same in both cases. Thus, it suffices to note that the foregoing description of the data consistency protocol for a one-level memory system aptly describes the consistency protocol as applied to each of the clusters of a multilevel system.

The extension of the data consistency protocol to multilevel systems requires the higher level caches 19a–19i to keep all of the state bits (shared, owner, and pendingState) a first level cache maintains, plus so-called "existsBelow" bits. More particularly, each of the higher level caches maintains one existsBelow state bit for each data block that it is caching. This existsBelow bit is set to a true("1") state for any given data block within a higher level cache if and only if one or more of the next lower level caches in the same branch of the memory tree also has a copy of the that particular data block. Thus, for example, in a two-level system of FIG. 1, the existsBelow bits enable the second level caches 19a–19i to filter packets that appear on the global bus 26, so that the only global bus traffic that produces traffic on a given cluster bus 15a, . . . or 15i is the global traffic that is relevant to one or more of the cluster bus client devices. As will be appreciated, without such filtration, all of the traffic on the global bus 26 would appear on every cluster bus 15a–15i, thereby defeating the purpose of the two-level organization of the memory system.

To provide a more comprehensive understanding of how packets appearing on a cluster bus relate to the packet traffic on the main or global bus 26 and vice versa, it will be useful to consider the operation of one of the second-level caches, such as the cache 19a, in some additional detail.

Whenever the second-level cache 19a receives a RBRqst from a requestor on its cluster bus 15a, the second-level cache 19a may or may not contain a copy of the data block specified by the RBRqst. If it has a copy, the second-level cache returns the data to the requestor via a RBRply, after setting the replyShared bit in the reply packet to the logically ORed SharedIn value of (a) the SharedOut signals that it receives from the first level caches as a result of the RBRqst and (b) the current state of its shared bit for the specified data block (as will be recalled, in a single-level system, the main memory controller 25 evaluates the SharedIn signal level on the SharedIn line 61 a fixed time after it receives the RBRqst from the requestor and copies that evaluated signal level into the replyShared bit of the header for the RBRply packet that it returns to the requestor).

If, on the other hand, the second-level cache 19a does not have a copy of the data block that is specified by the RBRqst of its cluster bus requestor, the second-level cache 19a issues a RBRqst packet on the global bus. Upon the return of the RBRply to this request, the second level cache updates itself with the new data block, uses its pendingState for its RBRqst to compute the value of its shared bit for this new data block, and then responds to the requestor by issuing a RBRply on the cluster bus 15a.

When a second-level cache, such as the cache 19a, receives a WSRqst from a requestor on its cluster bus, the cache 19a checks to determine if its shared bit for the data block containing the address specified by the WSRqst is set. If its shared bit for that particular data block is not set, the second level cache 19a updates its data in accordance with the WSRqst data, sets its owner bit for the updated data block, and then issues a WSRply (with the replyShared bit at the value of the SharedIn line 61 at the appropriate time) via its cluster bus. On the other hand, if the second level cache 19a has its shared bit for the data block that is subject to the WSRqst set to a true state ("1"), it propagates the WSRqst of the cluster-level requestor by issuing a WSRqst on the global bus 26. The main memory controller 25 responds to this global level request some time later by providing a WSRply. When this reply is received, the second-level cache 19a updates its copy of the data block in accordance with the WSRply reflection of the data provided by the WSRqst, sets its owner bit for its copy of the data block, and then issues a WSRply on its cluster bus (with the replyShared bit in the header cycle of this cluster-level WSRply set to the logical OR of the replyShared bit value in the WSRply received via the global bus 26 and the value of the SharedIn line 61 corresponding to the original WSRqst on the cluster bus).

Each second-level cache monitors the RBRqst packets on the global bus 26 to identify the RBRqsts for which it has an address match. When such an address match occurs, the second-level cache, such as the cache 19a, checks its owner bit and its existsBelow bit for its copy of the specified data block. If its owner bit for that particular data block is set, the cache 19a responds with the data, but the manner in which the RBRply packet is assembled depends upon whether its existBelow bit is also set or not. More particularly, if the existsBelow bit is set, the cache 19a first issues a RBRqst on its cluster bus 15a to retrieve the data that is called for by the global-level RBRqst from the first-level cache owner of the specified data block. If, however, the existsBelow bit for cache 19a's copy of the specified data block is not set, cache 19a concludes that its copy is current, so it responds with a global-level RBRply, without propagating the global level requestor's RBRqst.

When a second-level cache, such as the cache 19a, matches on the address specified in a WSRqst on the global bus 26, it asserts SharedOut as usual, but it takes no other action. However, when the cache 19a matches on the address specified in a WSRply on the global bus 26, it updates its copy of the data at that address. Additionally, if its existsBelow bit for its copy of the data block containing the address specified by the WSRply happens to be set, the cache 19a also issues a WSRply on its cluster bus 15a. It is noteworthy that this WSRply packet is not preceded by a corresponding WSRqst packet on the cluster bus, so that is another reason why the number of request and reply packets on a bus may be unequal.

When a second level cache gets a FBRqst from its cluster bus, it simply updates its copy of the data block to which the request is addressed and sends a FBRply, respectively back to the requestor. The responder for a FlushBlock always is the actual or apparent main memory for the responder, so second level caches ignore all FBRqsts on the global bus.

As will be recalled, the WriteBlock transaction is available for use by secondary data producers (data sources that are outside the memory system) to enter data into the physical address space. To that end, this transaction writes a cyclically ordered data block into main memory and into any caches that match on the address specified in the WBRqst. In multilevel systems, the WriteBlock transaction may be restricted for use as a global bus transaction. In that event, WBRqsts are issued only by devices that are interfaced with the global bus 26, and all WBRplys are supplied by main memory 13 (the WBRply for this restricted application of the WriteBlock transaction contains a standard reply header cycle followed by an undefined cycle). Alternatively, the WriteBlock transaction may be redefined to permit lower level caches to invoke it. If so, any WBRqsts that are issued by any of the lower level, local caches are passed on to the second level caches which, in turn, place the WBRqsts on the global bus 26. The write is executed upon receipt of the WBRply.

As will be appreciated, this embodiment requires that each of the second-level caches maintain copies of all data blocks that are cached below them. To that end, the second-level caches 19a–19i are each selected to have a data storage capacity that is at least equal to the sum of the storage capacities of the first-level caches on their respective cluster busses. Moreover, the second-level caches 19a–19i are each selected to have a degree of associativity that is at least equal to the sum of the associativities of the first-level caches on their respective cluster busses. For example, if a cluster comprises four first-level direct mapped caches (i.e., caches having one degree of associativity), the second-level cache for that cluster is selected to have at least four degrees of associativity to ensure that it can match on the address of any data block that might appear on its cluster bus.

II. An Enhanced Embodiment

The memory system of the present invention is readily extensible and easily enhanced, so some extensions and enhancements will be described to illustrate its potential for modification and improvement. The same topical outline that was used hereinabove to organize the description of the initial embodiment will be followed to identify the subjects to which the distinctive features of this enhanced embodiment pertain.

A. System Architecture

If desired, multiple busses may be interleaved to operate in parallel (not shown), thereby increasing the usable bus bandwidth at the expense of incurring a proportional increase in the number of bus wires that are required. For example, one implementation permits bits 8 and 9 in the address field of the headers for the request and reply packets (see FIGS. 11 and 12, respectively) to be employed for identifying the interleaved bus upon which a given packet is to be transmitted. Thus, in that implementation, one-way, two-way, and four-way interleaves of the bus architecture are permissible.

B. Device-Bus Interface

Figures 11, 12, 13:
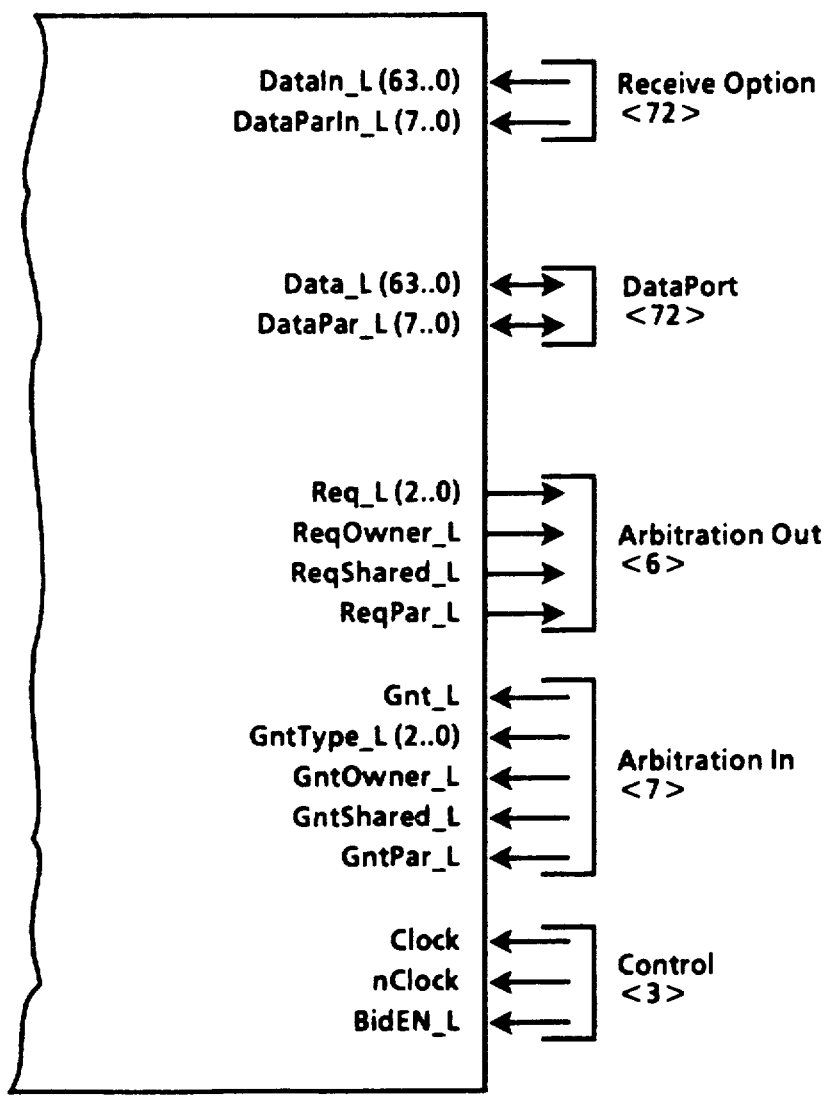
FIG. 11 is a bit-level diagram of the header cycle format for the request packets of the bus transactions that are performed by an enhanced embodiment of this invention.
FIG. 12 is a bit-level diagram of the header cycle format for the reply packets of the bus transactions that are carried out by the enhanced embodiment of this invention.
FIG. 13 is a functional diagram for identifying the various signal ports of the standard device-bus interface for the enhanced embodiment of this invention.
Figure 14:
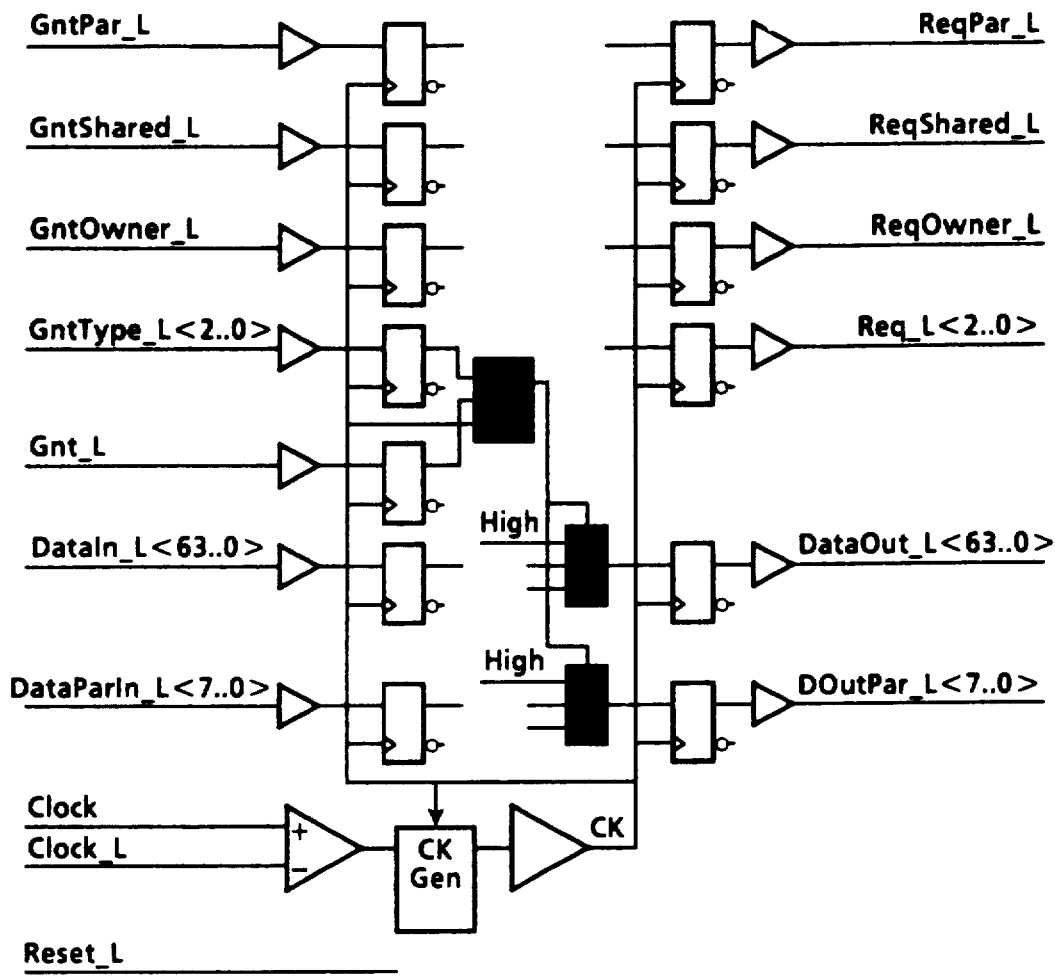
FIG. 14 is a simplified schematic diagram of the internal logic of the device-bus interface shown in FIG. 13.

As shown in FIG. 13, the standard device-bus interface 101 for the enhanced embodiment incorporates several notable modifications. Some of the differences relate to the terminology that is used to identify the various signals, but others are of substantive importance. The internal logic of the interface 101 is illustrated in FIG. 14. The drivers 104-109 and the receivers 111-117 that are shown in FIG. 14 typically are open drain CMOS devices in keeping with the teachings of the aforementioned Gunning application Ser. No. 07/502,372.

1. Signals

The substantive distinctions that exist between the signal ports of the interface 101 and the interface 41 of FIG. 4 are set forth in some detail under the following headings of this Section.

2. Arbitration Interface

As will be recalled, each bus of the memory system of the present invention has an arbiter for ensuring that all contending bus clients are given fair, bounded time access to their host bus and for implementing flow control to avoid packet congestion on the bus. As pointed out above, packet congestion is an issue because the bus or busses are packet switched, which means that a bus client can accumulate transaction requests faster than it is able to service them.

In this enhanced embodiment, each client device interacts with the arbiter for its bus via an arbitration port that has three request wires, Req—L[2..0], and three grant type wires, Gnt-Type—L[2..0]. In addition, there is a single Gnt—L wire that is shared by all of the clients that are connected to the arbiter.

A bus client communicates its arbitration requests to the arbiter for its bus by using its Req—L wires for either one clock cycle or two consecutive cycles. In the first cycle the client communicates the priority of its request. Additionally, for normal arbitration requests, the client uses a second cycle on one of its Req—L wires for informing the arbiter of the packet length for which it is requesting the bus. Typically, the encodings for the two cycles of these arbitration requests are as follows:

First Cycle
 7: Stop Arbitration
 6: Reply High
 5: Pause
 4: Reply Low
 3: Hold
 2: Request High
 1: Request low
 0: No request Second Cycle:
 L: Packet length (0= >2 cycles, 1= >9 cycles)

The four priorities Request Low, Request High, Reply Low, and Reply High correspond to "normal" arbitration requests for the bus. In other words, they are used when the device registering the arbitration request actually intends to send a packet. Reply High is used only for cache replies; Reply Low only for memory replies; and Request High for most requesters such as processor and IO caches. Request Low is used only by "background" devices that can tolerate arbitrarily long delays in getting grants from the arbiter. Again in this embodiment, a client may issue multiple arbitration requests back to back, in which case a separate request is registered for each pair of request cycles. Furthermore, the clients are responsible for ensuring that they do not exceed the implementation limit that is imposed by the arbiter on the number of arbitration requests that the arbiter can register on behalf of a given client. In keeping with the above-described arbitration rules, higher priority arbitration requests are serviced before lower priority requests, and arbitration requests within the same priority level are serviced in approximately round-robin order.

The other arbitration priorities that are supported by this embodiment (NoRequest, Hold, Pause, and Stop) are available to permit the clients to request special service from the arbiter for their host bus. These special arbitration requests are communicated to the arbiter by one cycle requests that specify the arbitration priority. A bus client uses NoRequest if it does not want to request any service from the arbiter. Hold is used by a client that wants to prevent the arbiter from granting any requests for request packets (priorities below Hold). Thus, Hold is similar in purpose and function to the "demand system-wide hold" and "release demand for system-wide hold" encodings of the arbitration requests that were employed in the previously described embodiment. In this embodiment, however, the arbiter stays in the Hold state for only as many cycles as the client asserts the Hold code. Pause is an encoding that is unique to this embodiment. It can be asserted by caches to avoid getting flooded by replies generated by memory. Finally, Stop is used when a device wants to stop all arbitration. It causes the arbiter to stop granting the bus for as many cycles as any client asserts the Stop code. Thus, it will be understood that the Stop code is functionally similar to the SStop signal that was contemplated by the initial embodiment.

Figure 15:
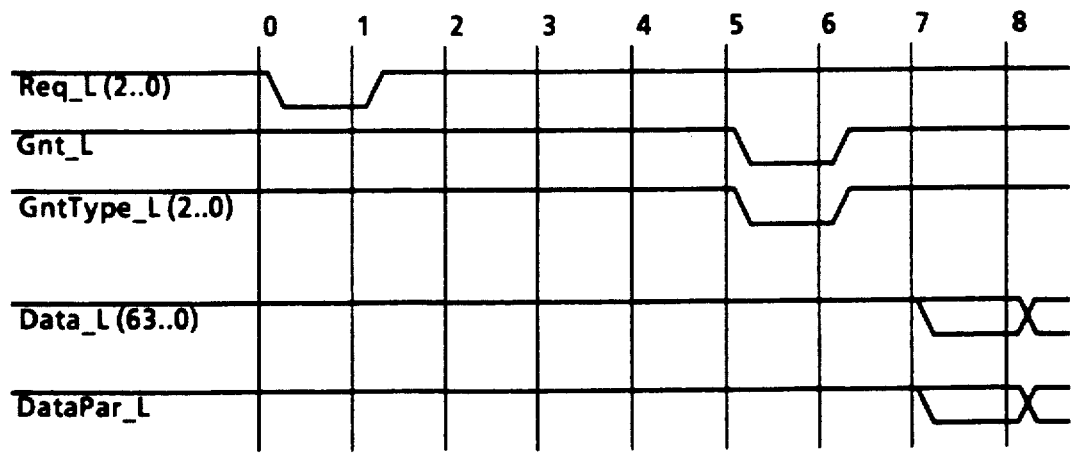
FIG. 15 is a timing diagram for illustrating the relative timing of certain of the signals that the enhanced embodiment of the invention relies upon for the arbitration and transmission two cycle long request and reply packets.

Gnt—L and GntType—L are used by the arbiter to inform a client that it has been selected by the arbiter to be the next bus master. These signals are asserted for just one cycle to confer bus mastership upon the selected bus client for a sequence of subsequent cycles, with GntType—L indicating the priority of the arbitration request for which the grant is being given. To that end, GntType—L suitably is encoded as follows:

7: Stop Arbitration
6: Grant Reply High
5: Reserved (not used)
4: Grant Reply Low
3: Reserved (not used)
2: Grant Request High
1: Grant Request Low
0: No Grant A given client has a valid grant from the arbiter for its bus only when Gnt_L is asserted and GntType_L for the that client is non-zero. In this embodiment, if Gnt_L and GntType_L are asserted on cycle i at the interface 101 for a given client device, the client can drive its outgoing unidirectional or bidirectional bus segment in cycle i+2. FIG. 15 shows the timing of the more important arbitration request and grant signals at the device-bus interface 101 of the arbitration requester during the arbitration (a five cycle arbitration latency has been assumed) and the transmission of a packet. FIG. 14 should be kept in mind while reading FIG. 15.

As in the above-described embodiment, the arbiter has two different mechanisms for implementing flow control. Arbitration priorities are the first of these flow control mechanisms. As will be understood, client devices that issue both request and reply packets always assign higher priorities to their arbitration requests for the transmission of reply packets than to their arbitration requests for the transmission of request packets. This alone would be sufficient to eliminate the congestion problem if devices were always ready to reply before the onset of congestion, but it may not be possible for all devices to satisfy this requirement. For example, it would impractical to expect slower devices, such as the memory controller 25 (FIG. 1), to respond at the arrival rate to the request packets they may receive. Furthermore, the input queue lengths that such devices would have to be able to accumulate without risk of overflowing would be prohibitively long.

Thus, the arbiter implements a second flow control mechanism through its above-described responses to the Hold and Pause arbitration request encodings. As will be appreciated, the arbiter's response to a Hold or Pause request is not instantaneous, so the client devices have to reserve adequate headroom within their input queues to allow them to accumulate a few incoming packets while their Hold or Pause request is taking effect at their bus arbiter. There is, however, a balance to be struck because the bus throughput can be adversely affected needlessly if any of its client devices request a Hold or a Pause too frequently.

3. Data/Control Interface

The data port and the optional receive port of the interface 101 (FIG. 13) are similar in purpose and function to the send and receive ports, respectively, of the interface 41 (FIG. 4). However, the HeaderCycleIn and HeaderCycleOut signals of the interface 41 have been eliminated in favor of employing an inverse parity syndrome for identifying the header cycles of the packets. This is practical because parity is computed in this enhanced embodiment at the byte-level for each cycle of every packet on each bus. Given that each bus typically provides a 64 bit-wide multiplexed address/data path, this means that there are eight parity bits for each cycle of every packet. As a result, the correct even parity encoding for data cycles is separated from the correct odd parity encoding for header cycles by a Hamming distance of 8, which is believed to be ample separation to prevent this unusual use of parity from compromising the ability to detect parity errors using standard error detection techniques.

Another distinguishing feature of the interface 101 is that a BidEN_L signal is applied to its control port to affirmatively indicate whether the interface 101 is connected to a unidirectional bus segment or a bidirectional bus segment. When BidEN_L is asserted or true ("1"), the DataPort is operated in a bidirectional mode to support bidirectional packet communications back and forth between a client device and a bidirectional bus segment. One the other hand, when BidEN_L is deasserted or false ("0"), the DataPort is operated in a unidirectional output mode, and the ReceiveOption port is operated in a unidirectional input mode.

4. Consistency Port

The consistency port of the interface 41 shown in FIG. 4 has no direct counterpart in the interface 101 of FIG. 13, but it will be seen that the consistency signals have been merged into the arbitration port of the interface 101. This presentational change has been made because it has been found that the arbiter for each bus is a convenient place (a) for logically ORing the ReqShared_L signals from the bus clients (identified previously as the SharedOut signals) to provide a GrantShared_L signal (identified previously as the SharedIn signal) for those clients, and (b) for logically ORing the ReqOwner_L signals from the bus clients (identified previously as the OwnerOut signals) to provide a GrantOwner_L signal (identified previously as the OwnerIn signal) for them. Indeed, ReqShared_L, GrantShared_L, ReqOwner_L, and SharedOut_L are functionally equivalent to the SharedOut, SharedIn, OwnerOut, and OwnerIn signals, respectively, of the interface 41, so the SharedOut, SharedIn, OwnerOut, and OwnerIn nomenclature will be used to refer to those signal hereinbelow in the interest of simplifying the description of the extended data consistency protocol. An additional advantage of merging the consistency signals into the arbitration port of the interface 101 is that it facilitates combined parity checking of the arbitration and consistency input and output signals, such as through the use of single bit parity encoding at the interface 101 for the output signals and at the arbiter for the input signals.

C. Transactions

The transactions that have been defined for this embodiment are:

| Transaction Name | Rqst/Rply Abbreviation | Command Encoding (Rqst/Rply) | Rqst/Rply Packet Length |
|---|---|---|---|
| Noop/Error | Noop/Error | 00000 (0/1) | 1/1 cycle |
| WriteSingleInvalidate | WSIRqst/ WSIRply | 00001 (0/1) | 2/2 cycles |
| NonCacheableReadBlock | NCRBqst/ NCRBRply | 00010 (0/1) | 2/9 cycles |
| FlushBlock | FBRqst/ FBRply | 00011 (0/1) | 9/2 cycles |
| (Undefined) | — | 00100 (0/1) | — |
| WriteSingleUpdate | WSURqst/ WSURply | 00101 (0/1) | 2/2 cycles |
| ReadBlock | RBRqst/ RBRply | 00110 (0/1) | 2/9 cycles |
| WriteBlock | WBRqst/ WBRply | 00111 (0/1) | 9/9 cycles |
| IOReadSingle | IORSRqst/ IORSRply | 01000 (0/1) | 2/2 cycles |
| IOWriteSingle | IOWSRqst/ IOWSRply | 01001 (0/1) | 2/2 cycles |

-continued

| Transaction Name | Rqst/Rply Abbreviation | Command Encoding (Rqst/Rply) | Rqst/Rply Packet Length |
|---|---|---|---|
| IOReadBlock | IORBRqst/ IORBRply | 01010 (0/1) | 2/9 cycles |
| IOWriteBlock | IOWBRqst/ IOWBRply | 01011 (0/1) | 9/2 cycles |
| (Undefined) | — | 01100 (0/1) | — |
| Lock | LRqst/ LRply | 01101 (0/1) | 2/2 cycles |
| DemapInitiate | DmIRqst/ DmIRply | 01110 (0/1) | 2/2 cycles |
| Interrupt | Int/— | 01111 (0/1) | 2/— cycles |
| (Undefined) | — | 10000 (0/1) | — |
| SwapSingleInvalidate | SSIRqst/ SSIRply | 10001 (0/1) | 2/2 cycles |
| (Undefined) | — | 10010 (0/1) | — |
| KillBlock | KBRqst/ KBRply | 10011 (0/1) | 2/2 cycles |
| (Undefined) | — | 10100 (0/1) | — |
| SwapSingleUpdate | SSURqst/ SSURply | 10101 (0/1) | 2/2 cycles |
| (Undefined) | — | 10110 (0/1) | — |
| (Undefined) | — | 10111 (0/1) | — |
| (Undefined) | — | 11000 (0/1) | — |
| IOSwapSingle | IOSSRqst/ IOSSRply | 11001 (0/1) | 2/2 cycles |
| (Undefined) | — | 11010 (0/1) | — |
| (Undefined) | — | 11011 (0/1) | — |
| (Undefined) | — | 11100 (0/1) | — |
| UnLock | URqst/ URply | 11101 (0/1) | 2/2 cycles |
| DemapTerminate | DmTRqst/ DmTRply | 11110 (0/1) | 2/2 cycles |
| (Undefined) | — | 11111 (0/1) | — |

Again, the first cycle of every request and reply packet is a header cycle. Returning to FIG. 11, it will be seen that the header cycle for the request packets is formatted in this embodiment to have a six bit wide command field (including a request/reply flag bit) to provide sufficient capacity for the encoding of the increased number of transactions that have been defined, together with a forty-two bit wide address field. The two higher order bits of the address field are employed to specify the size (SSize) of an addressed "single" for the various "single" transactions that have been implemented (WriteSingleUpdate, I/OReadSingle, etc.), while the forty lower order bits of this field are available for specifying a byte address in either the I/O address space or the memory address space (i.e., the physical address space). One implementation employs only thirty-six of these byte address bits, so the four remaining bits (e.g., the four higher order bits of the byte address) are reserved for future address extensions (see the above description of the provision that is made for reserved or unused address bits).

The request packet header cycle of FIG. 11 additionally includes a PLen bit for signaling whether the packet is a long (9 cycle) packet or a short (2 cycle packet). This encoding is redundant with the command that is carried in the command field of the header, but it permits the proper decoding of yet undefined commands that may be associated in some instances with long packets and in others with short packets. Furthermore, there a Ow bit for controlling the state of the owner bit that is maintained on any given data block by a cache requestor which initiates a transaction that may affect the value or the shared status of the given data block. The transactions of this embodiment that fall into that category are WriteSingleUpdate, WriteSingleInvalidate, SwapSingleUpdate, SwapSingleInvalidate, and ReadBlock. The state of the Ow bit in the headers of the request packets for those transactions indicates whether the requestor is or is not prepared to accept the ownership of the data block to which the transaction pertains. For all other transactions, the value of the Ow bit is maintained in a false ("0") state.

The headers of the request packets of this embodiment also contain an eight bit wide DeviceID field and a four bit wide SubID field, which are similar in purpose and function to the DeviceID's that are carried by the headers of the above-described embodiment (in this instance, the SubID's may be employed for enabling a bus client device to disambiguate replies to multiple outstanding requests, or the SubID field may be employed to encode internal or pendingState for a transaction requestor to avoid having to store that state internally of the requestor (see the discussion of the consistency protocol). The header shown in FIG. 11 additionally includes an error bit (Err) and an unused bit, both of which are maintained in a false ("0") state in request headers (the Err bit is meaningful only in reply headers).

A comparison of FIG. 12 with FIG. 11 will confirm that the header cycle for a reply packet is bit-by-bit identical to the header of the corresponding request packet, except that the request/reply bit of the command field is inverted to identify the packet as a reply; the length (i.e., long or short) of the reply packet is encoded by the PLen bit; the Err bit is set to a true ("1") state or maintained in a false ("0") state depending on whether the responder encountered an error or not while assembling the reply; the state of the Ow bit is employed to indicate whether the requestor is or is not permitted to acquire ownership of the data block to which the transaction pertains; and the unused bit of the request header is employed as a shared (Sh) bit to signal whether the data to which the corresponding request was addressed was shared or not at the time the request packet was received (a more rigorous description of such shared data appears hereinabove).

1. Memory Related Transactions

The memory access transactions that have been provided for this embodiment are ReadBlock, NonCacheableReadBlock, FlushBlock, WriteBlock, WriteSingleUpdate, WriteSingleInvalidate, SwapSingleUpdate, SwapSingleInvalidate, and KillBlock. The ReadBlock, WriteBlock, and FlushBlock transactions are equivalent in most respects to the correspondingly named transactions of the first embodiment, except that these and the other "block" transactions of this embodiment utilize an eight cycle data transport unit (i.e., eight bus cycles, each of which contains eight contiguous bytes). Furthermore, the WriteSingleUpdate transaction is functionally similar to the WriteSingle transaction of the earlier embodiment, but its name has been changed to distinguish it from the newly defined WriteSingleInvalidate transaction. Likewise, SwapSingleUpdate is a relatively minor modification of the above-described ConditionalWriteSingle transaction (i.e., SwapSingleUpdate is used to perform atomic reads and writes, rather than the atomic read-modify-write that a ConditionalWriteSingle carries out). It is identified as an "Update" transaction to differentiate it from the newly defined SwapSingleInvalidate transaction.

The WriteSingleInvalidate and SwapSingleInvalidate transactions have been defined to provide write invalidate-style counterparts to the WriteSingleUpdate and SwapSingleUpdate transactions, respectively. They enable a cache requestor to update its copy of a specified data block, while causing any other cache that contains a copy of the same data block to invalidate its copy, unless the invalidation request is addressed to a data block upon which the receiving cache happens to have a transaction pending. As will be recalled, a cache can invalidate or delete any of its data blocks simply by clearing its Valid bit for the data block to a false ("0") state.

In this embodiment, the ownership of a data block that has been modified after being read out of main memory 13 (FIG. 1) does not necessarily belong to the cache for the processor that last wrote into it. Instead, the transfer of data block ownership is controlled by the state of the Ow bit in the header cycles of the request and reply packets for the WriteSingleUpdate, WriteSingleInvalidate, SwapSingleUpdate, SwapSingleInvalidate, and ReadBlock transactions. More particularly, all caches, except the requestor, that match on a WSIRply, a WSURply, a SSIRply, or a SSURply unconditionally clear their owner bits for the specified data block to a false ("0") state. The requestor, on the other hand, sets ("1") or clears ("0") its owner bit for that data block upon receiving such a reply depending on the state of the Ow bit in the reply. If the Ow bit in the reply header is set to a true ("1") state, the requestor sets its owner bit for the data block to a true ("1") state. But, if the Ow bit in the reply header is cleared to a false ("0") state, either because the Ow bit in the corresponding request packet was cleared to a false ("0") state by the requestor or because the responder cleared the Ow bit to a false ("0") state for some other reason while preparing the reply, the requestor then clears its owner bit for the data block to which the transaction pertains to a false ("0") state. As will be appreciated, the main memory 13 (FIG. 1) is the default owner of all data blocks in the physical address space. Accordingly, if the header of a WSIRqst, a WSURqst, a SSIRqst, or a SSURqst contains a false ("0") Ow bit, the memory 13 ordinarily is updated in accordance with the new data that is provided by the request. Of course, a cache that issues a SSIRqst or a SSURqst still is responsible for providing the old data to its processor in support of the read phase of these transactions, so the requestor retains that datum value at least until it receives the reply to its request.

The Ow bit is also used in ReadBlock transactions. Specifically, it is set to a true ("1") state in a RBRqst that is issued by a cache requestor as a prelude to a write by their associated processors for signaling that the requestor desires to set its owner bit for the specified data block to a true ("1") state when it receives corresponding RBRply. Thus, it will be understood that the Ow bit in the header of a RBRqst permits an accelerated transfer of ownership of the specified data block to the requestor.

Another distinguishing feature of the ReadBlock transaction for this embodiment is the provision that has been made for enabling a RBRply to inform the requestor whenever a memory error occurs while fetching the data that should be returned to the requestor in any of the data cycles of the reply. If the responder finds that any such data fetch error has been made, it substitutes a memory fault (MemFault) cycle for each of RBRply data cycles that are affected by the error or errors. A MemFault cycle is uniquely identifiable because (a) the parity for it is inverted to the odd parity of a header cycle, (b) it contains the command code for Noop, and (c) its DeviceID and SubDeviceID fields are empty (all 0's). An error code identifying the type of memory error that occurred is carried by the thirty-two lower order bits of such a MemFault cycle. An important advantage of providing such a memory fault cycle mechanism is that it permits the responder to issue a RBRply while it still is performing the requested memory read operation, which means that the memory latency can be reduced.

KillBlock is a new transaction that has been defined to enable second or higher level caches (as well as main memory) to remove unused data blocks from the lower level caches to which they branch. For example, returning for a moment to FIG. 1, the cache 19a could initiate a KillBlock to remove all copies of a specified data block from all of caches 16aa–16aj that are on the cluster bus 15a.

More particularly, the KillBlock transaction is important because it permits a second or higher level cache to victimize an existing data block so that the storage location that was allocated to that data can be reallocated for storing the new data that the cache acquires by performing a ReadBlock on its upper or higher level bus (i.e., the global bus 26 in the case of the cache 19a). As will be recalled, these higher level caches initiate a ReadBlock on their upper bus whenever they "miss" on a RBRqst of any of the caches on their lower level bus (e.g., the bus 15a). Thus, the KillBlock transaction has been defined to avoid the potentially cumbersome "associator coverage" requirement that was imposed on the second or higher level caches of the initial embodiment. More particularly, it will be recalled that associated coverage can be provided for the first level caches by selecting each of the second level caches 19a–19i to have (a) a capacity that at least equal to the sum of the capacities of the first level caches that exist below them, and (b) a degree of associativity that is at least equal to the sum of the associativities of those first level caches. However, the KillBlock transaction provides an alternative and potentially less costly technique for ensuring that the second level caches provide full coverage for the their first level, child caches (i.e., the first level caches to which they branch).

To perform a KillBlock, a higher level cache selects a potential victim data block through the use of a suitable victimization algorithm (any of the well known victimization algorithms can be employed), and then checks the state of its owner bit for the selected data block. If its owner bit for the potential victim block is set to a true ("1") state, the KillBlock initiator first issues a RBRqst on its lower level bus (i.e., the cluster bus 15a in the case of the second level cache 19a). This RBRqst is addressed to the potential victim, so it allows the KillBlock initiator to update its copy of the potential victim when it receives the corresponding RBRply. After updating itself if necessary (no update is performed if the KillBlock initiator has its owner bit for the potential victim cleared to a false ("0") state), the KillBlock initiator uses its lower level bus to issue a KBRply that is addressed to the potential victim. Each of the lower level caches (e.g., the caches 12aa–12aj) that matches on this KBRply clears its Valid bit for its copy of the specified data block, unless it has a transaction pending thereon. The KillBlock initiator next issues a KBRqst on its lower level bus. This KBRqst is addressed to the potential victim, so the KillBlock initiator checks the state of its GrantShared_L input signal (in other words, its SharedIn signal) when it receives its KBRqst to determine any of the lower level caches asserted ReqShared_L (or SharedOut) in response to its KBRqst. If so, the KillBlock initiator resets itself to postpone the victimization of the selected data block until some future time. However, if none of the lower level caches assert ReqShared_L(SharedOut) upon receiving the KBRqst, the KillBlock initiator has confirmation that there are no copies of the specified data block in any of the caches on its lower level bus, so it then initiates a FlushBlock on its higher level bus to write its copy of the data block back to main memory 13 (or back to the next higher level cache).

Another transaction that has been defined to increase the efficiency of the memory system is the NonCacheableReadBlock transaction. This transaction is equivalent to the above-described ReadBlock transaction, except that it does not affect the shared/not shared status of the data block to which it is addressed. Its application, therefore, is limited to reading data blocks from the consistent memory space (i.e., physical address space) on behalf of non-cache requestors, such as DMA I/O devices.

2. I/O Transactions

The I/O transactions have been extended to provide additional transactional support for reading and writing data blocks from and to I/O devices (IOReadBlock and IOWriteBlock, respectively) and for performing atomic read-writes to I/O devices (IOSwapSingle). Moreover, the BIOWrite transaction of the first embodiment has been omitted in favor of providing a more specific Interrupt transaction that is briefly described in the next Section.

3. Other Transactions

The Lock and UnLock transactions are two of the more interesting extensions in this category. Lock can be invoked by a cache requestor to prevent any bus client, except for the requestor, from performing any transaction that might affect the value of a specified data block (i.e., WriteBlock, WriteSingleUpdate, WriteSingleInvalidate, SwapSingleUpdate, SwapSingleInvalidate, or KillBlock). It, therefore, is useful for imposing a degree of atomic ordering on the transactions that are imposed on a given data block. It also is useful to preventing a cache from having to perform an indefinite number of retries on a RBRqst that returns stale data because of the frequency of the writes to the requested data block. Lock conveniently is invoked by registering the address (LockAddress) of the locked data block with all cache clients and by providing a flag bit (LockAddressValid) bit that is set to a true ("1") state for all caches, other than the requestor. Thus, the current implementation of this feature permits no more than one data block to be locked at any given time. UnLock is the counterpart transaction that the holder of a Lock can invoke to clear its Lock. It accomplishes that by causing each of the caches to clear its LockAddressValid bit for the specified data block.

As previously mentioned, an Interrupt transaction also has been defined for signaling interrupts to processors. Processor interrupts are beyond the scope of this invention, but it is noted that this Interrupt transaction may be targeted to a specified processor or broadcast to all processors in the system.

DemapInitiate is similar to the above-described DeMap transaction. In this instance, however, the virtual-to-physical address translation is performed by transaction look aside buffers (not shown) that are provided for the processors $12aa$-$12ij$ (FIG. 1), respectively. Thus, a DeMapTerminate transaction has been defined, so that each of the processors $12aa$-$12ij$ can cause its first level cache $16aa$-$16ij$ to initiate this transaction when the requested DeMap has been completed. The caches $16aa$-$16ij$ assert ReqShared_L (SharedOut) while their processors $12aa$-$12ij$ are performing a demap operation, so a DeMapInitiate requestor obtains confirmation that all of the processors $12aa$-$12ij$ have completed the requested demap when it matches a DmIRply that has its Sh (in other words, replyShared) bit cleared to a false ("0") state.

F. Data Consistency

The WriteSingleInvalidate, SwapSingleInvalidate and KillBlock transactions that have been defined for this embodiment of the invention reduce the amount of data block sharing that occurs, thereby causing the data consistency protocol to behave as a hybrid update/invalidate protocol, rather than as a pure update protocol as in the first embodiment. This change has been made for the purpose of increasing the efficiency of the consistency protocol. Even though it is still uncertain whether there is a marked improvement in the efficiency of the consistency protocol because of these new transactions, it is clear that the new transactions do not adversely affect either the utility or the efficiency of the consistency protocol.

Another charge that has been made to the consistency protocol relates to the use of the Ow bit in the header cycles of the request and reply packets. As pointed out above, this bit gives the requestors and responders that participate in the reads and writes that are carried out within the consistent memory space some additional control over the transfer of the ownership of the data blocks to which such reads and writes are directed. It does not, however, affect the validity or utility of either the pure update consistency protocol or the hybrid update/invalidate consistency protocol. Rather, it provides support for caches that are implemented using an architecture (not shown) that relies upon replicated, asynchronously maintained, address/status tags for keeping track of whether specified data blocks are "shared" or not and "owned" or not. Status changes propagate from tag-to-tag of such a cache, so a race condition can occur whenever a processor issues a write to a locally cached data block that appears to be not shared and not owned from the processor side of the cache.

To avoid such race conditions, a cache may be required to initiate a WriteSingle whenever its associated processor issues a write directed toward a data block for which the cache is holding false ("0") shared and owner status bits, but this increases the bus traffic. Therefore, to reduce the frequency of such WriteSingles, the Ow bit has been included. Specifically, when issuing a RBRqst to obtain a copy of a data block for which its processor has a pending write, a cache can set the Ow bit in the header cycle of its RBRqst to a true ("1") state, thereby notifying the responder that the requestor is requesting that the Ow bit be set to a true ("1") state in the corresponding RBRply.

What is claimed:

1. A method for preserving data consistency for all physical addresses used by a shared memory multiprocessor: said multiprocessor having a main memory for storing a complete, non-overlapping data cover for all of said physical addresses; a packet switched bus coupled to said main memory; a plurality of data processing means for manipulating data at respective, potentially overlapping sets of said addresses; and a corresponding plurality of cache memories coupled between said bus and respective ones of said data processing means for giving the respective data processing means read and write access to cached versions of the data stored at a respective sets of said addresses: said cache memories being snoopy, write back cache memories for initiating, responding to, and participating in transactions on said bus for reading copies of the data at selected addresses into any given one of said cache memories in reply to a read request made by said given cache memory, and for broadcasting data updates for any selected address from any given one of said cache memories to all of the other of said cache memories in reply to a write request that is made by the given cache memory whenever it is determined that such an update is directed to an address that is shared by a plurality of said cache memories: each of said transactions including a request packet that is issued by the cache memory requesting the transaction and a time dissociated reply packet that is issued by a responder; said request and reply packets uniquely identifying the cache memory requesting the transaction, the requested transaction type, and the address to which the transaction is directed; the reply packet for each read transaction further including a copy of the data at the address to which the read transaction is directed in a data transport unit containing a predetermined number of contiguous addresses that are read into and cached by the cache requesting the transaction as a data block; and the reply packet for each write transaction further including the data update for the address to which the write transaction is directed, such that said update is written into all cached copies of said address in response to the reply packet: said method comprising the steps of maintaining, for each of said cache memories, a shared state and an owner state for each data block cached therein;

maintaining, for each of said cache memories, a pending state for each data block cached therein that is subject to a pending transaction of the respective cache memory;

monitoring all bus transactions for setting the shared state for any given data block within any given one of said cache memories to a true state whenever it is determined that the given data block is shared by at least one other of said cache memories;

setting a reply shared flag in the reply packet for such a read or write request to a true state if the request packet is addressed to shared data;

checking the shared status within any given cache memory that receives a write from its respective data processing means to determine whether said write is directed to a shared data block and, if so, causing said given cache memory to issue a corresponding write request on said bus for broadcasting said write to all other caches containing said data block;

setting the owner state for a given data block to a true state within a given cache memory whenever its respective data processing means is responsible for providing a latest update for said given data block;

transferring data block ownership of shared data blocks from cache memory to cache memory upon receiving the reply packets for the write transactions by which said data blocks are updated, whereby the owner state for a given data block is set to a true state in, at most, one of said caches at any given time;

checking, on each request, to determine whether any of said cache memories assert ownership of the address to which said read request is directed;

reading the data for the reply packet for such a read request from a cache memory owner of the data block containing the address to which the read request is directed or from said main memory, depending on whether ownership is asserted or not, respectively, in response to said read request;

updating the pending state for each pending read and write transaction of said cache memories to reflect any changes in the shared status of the address to which said transaction is directed that occur while the transaction is pending; and logically ORing the pending state for each pending read transaction of each cache memory with the reply shared flag in the reply packet for such transaction, so that the shared state for the data block that is loaded into said cache memory in response to said reply packet is set to a true sate if said data block becomes shared at any time prior to the receipt of said reply packet.

2. A method for preserving data consistency for all physical addresses used by a shared memory multiprocessor: said multiprocessor having a main memory for storing a complete, non-overlapping data cover for all of said physical addresses; a packet switched bus coupled to said main memory; a plurality of data processors for manipulating data at potentially overlapping sets of said addresses; and a corresponding plurality of cache memories coupled between said bus and respective ones of said data processors for giving said data processors read and write access to cached versions of the data stored at a respective sets of said addresses: said cache memories being snoopy, write back cache memories for initiating, responding to, and participating in transactions on said bus, including a read transaction for reading a copy of the data at a specified addresses into a given one of said cache memories in reply to a read request issued by said given cache memory, and a write transaction for broadcasting a data update for a specified address from any given one of said cache memories to all of the other of said cache memories in reply to a write request that is made by the given cache memory whenever it is determined that such a data update is directed to an address that is shared by a plurality of said cache memories: each of said transactions including a request packet that is issued by the cache memory requesting the transaction and a time dissociated reply packet that is issued by a responder; said request and reply packets uniquely identifying the cache memory requesting the transaction, the requested transaction type, and the address to which the transaction is directed; the reply packet for each read transaction being characterized by further including a copy of the data at the address to which the read transaction is directed in a data transport unit containing a predetermined number of contiguous addresses that are read into and cached as a data block by the cache requesting the transaction; and the reply packet for each write transaction being characterized by further including the data update for the address to which the write transaction is directed, such that said data update is written into all cached copies of said address in response to the reply packet: said method comprising maintaining, for each of said cache memories, a shared state and an owner state for each data block cached therein;

monitoring all bus transactions for setting the shared state for any given data block within any given one of said cache memories to a true state whenever it is determined that the given data block is shared by at least one other of said cache memories;

setting a reply shared flag in the reply packet for such a read or write request to a true state if the request packet is addressed to shared data;

checking the shared status within any given cache memory that receives a write from its respective data processing means to determine whether said write is directed to a shared data block and, if so, causing said given cache memory to issue a corresponding write request on said bus for broadcasting said write to all other caches containing said data block;

setting the owner state for a given data block to a true state within a given cache memory whenever its respective data processing means is responsible for providing a latest update for said given data block;

transferring data block ownership of shared data blocks from cache memory to cache memory upon receiving the reply packets for the write transactions by which said data blocks are updated, whereby the owner state for a given data block is set to a true state in, at most, one of said caches at any given time;

checking, on each request, to determine whether any of said cache memories assert ownership of the address to which said read request is directed; and reading the data for the reply packet for such a read request from a cache memory owner of the data block containing the address to which the read request is directed or from said main memory, depending on whether ownership is asserted or not, respectively, in response to said read request.

3. The method of claim 2 further comprising maintaining, for each of said cache memories, a pending state for each data block cached therein that is subject to a pending transaction of the respective cache memory;

updating the pending state for each pending read and write transaction of said cache memories to reflect any changes in the shared status of the address to which said transaction is directed that occur while the transaction is pending; and logically ORing the pending state for each pending read transaction of each cache memory with the reply shared flag in the reply packet for such transaction, so that the shared state for the data block that is loaded into said cache memory in response to said reply packet is set to a true sate if said data block becomes shared at any time prior to the receipt of said reply packet.

* * * * *